US009967145B2

United States Patent
Kim

(10) Patent No.: US 9,967,145 B2
(45) Date of Patent: May 8, 2018

(54) SYSTEM FOR UTILITY USAGE TRIGGERING ACTION

(71) Applicant: Belkin International Inc., Playa Vista, CA (US)

(72) Inventor: Ryan Yong Kim, Rolling Hills Estates, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 337 days.

(21) Appl. No.: 14/550,519

(22) Filed: Nov. 21, 2014

(65) Prior Publication Data

US 2016/0150298 A1 May 26, 2016

Related U.S. Application Data

(63) Continuation of application No. 14/550,199, filed on Nov. 21, 2014.

(51) Int. Cl.
  *H04L 12/24* (2006.01)
  *H04L 12/26* (2006.01)
  (Continued)

(52) U.S. Cl.
  CPC ......... *H04L 41/082* (2013.01); *F24H 9/2007* (2013.01); *H04L 43/062* (2013.01);
  (Continued)

(58) Field of Classification Search
  CPC ..... F24H 9/20; F24H 9/2007; H04Q 2209/60; H04Q 9/00; G01R 22/066; Y02B 70/32;
  (Continued)

(56) References Cited

U.S. PATENT DOCUMENTS

| 7,624,174 B2 | 11/2009 | Sanghvi et al. |
| 8,193,929 B1 * | 6/2012 | Siu ...................... H04L 12/2829 340/538 |

(Continued)

OTHER PUBLICATIONS

International Search Report and Written Opinion of the International Searching Authority for PCT Application No. PCT/US2015/061478, dated Feb. 29, 2016, 12 pages.

(Continued)

*Primary Examiner* — Hai Phan
*Assistant Examiner* — Franklin Balseca
(74) *Attorney, Agent, or Firm* — Kilpatrick Townsend & Stockton LLP

(57) ABSTRACT

The present disclosure relates to using sensors and measurements from sensors to trigger actions within a network. Specifically, various techniques and systems are provided for measuring usage or measurements, using sensors, of utilities or other environmental factors, generating profiles based on the usage or measurements, and triggering actions within a network device based on the usage, measurements and profiles. Embodiments of the present invention may include, for example, compiling historical usage based on the use or measurements detected by a network device and generating a usage profile based on that use or measurements. The normal usage profile may be compared with the usage over a certain predetermined period of time to detect any abnormal use or measurements from the network device, and an action may be taken as a result of an abnormality.

33 Claims, 23 Drawing Sheets

(51) Int. Cl.
  *F24H 9/20* (2006.01)
  *H04Q 9/00* (2006.01)
  *H04L 29/08* (2006.01)

(52) U.S. Cl.
  CPC .......... *H04L 43/0876* (2013.01); *H04L 67/12* (2013.01); *H04Q 9/00* (2013.01); *H04Q 2209/60* (2013.01)

(58) Field of Classification Search
  CPC ............ Y02B 70/3208; Y02B 70/3216; Y02B 70/3225; Y02B 70/3233; Y02B 70/3241; Y04S 20/22–20/227; H04L 41/082; H04L 43/062; H04L 43/0876; H04L 67/12
  See application file for complete search history.

(56) References Cited

U.S. PATENT DOCUMENTS

| | | |
|---|---|---|
| 2011/0314320 A1 | 12/2011 | Chang et al. |
| 2012/0022812 A1 | 1/2012 | Longtin et al. |
| 2012/0203386 A1 | 8/2012 | Fakos et al. |
| 2012/0296486 A1 | 11/2012 | Marriam et al. |
| 2012/0323510 A1* | 12/2012 | Bell .......................... H02J 3/14 702/62 |
| 2013/0113616 A1* | 5/2013 | Pinel .................. G06Q 10/0631 340/501 |
| 2014/0344139 A1 | 11/2014 | Smith et al. |
| 2015/0268683 A1* | 9/2015 | McCullough ............. H02J 3/00 700/276 |
| 2016/0041565 A1* | 2/2016 | Edwards .................. E03C 1/00 700/282 |
| 2016/0149755 A1 | 5/2016 | Kim |
| 2016/0149777 A1 | 5/2016 | Kim |

OTHER PUBLICATIONS

First Action Interview Pilot Program Pre-Interview Communication of Aug. 24, 2017, for U.S. Appl. No. 14/550,199, 6 pages.
First Action Interview Pilot Program Pre-Interview Communication of Aug. 24, 2017, for U.S. Appl. No. 14/550,478, 6 pages.

\* cited by examiner

| | Normal Showerhead Water Profile | |
|---|---|---|
| 1. | 12:00AM – 6:35AM | 0-0.2 gal |
| 2. | 6:35AM – 6:48AM | 20-22 gal |
| 3. | 6:48AM – 7:05AM | 2-3 gal |
| 4. | 7:05AM – 7:28AM | 27-31 gal |
| 5. | 7:28AM – 7:58AM | 2.5-3.5 gal |
| 6. | 7:58AM – 6:05PM | 0-0.3 gal |
| 7. | 6:05PM – 9:15PM | 5.5-6 gal |
| 8. | 9:15PM – 9:40PM | 3-3.5 gal |
| 9. | 9:40PM – 10:15PM | 1-1.5 gal |
| 10. | 10:15PM – 11:59PM | 0-0.5 gal |

1300B

| Showerhead Water Profile for Monday, January 15 | | |
|---|---|---|
| 1. | 12:00AM – 6:35AM | 4.8 gal |
| 2. | 6:35AM – 6:48AM | 21 gal |
| 3. | 6:48AM – 7:05AM | 2 gal |
| 4. | 7:05AM – 7:28AM | 28 gal |
| 5. | 7:28AM – 7:58AM | 3.5 gal |
| 6. | 7:58AM – 6:05PM | 0 gal |
| 7. | 6:05PM – 9:15PM | 6 gal |
| 8. | 9:15PM – 9:40PM | 3.5 gal |
| 9. | 9:40PM – 10:15PM | 1.25 gal |
| 10. | 10:15PM – 11:59PM | 1.4 gal |

| Showerhead Water Profile for Monday, June 15 | | |
|---|---|---|
| 1. | 12:00AM – 6:35AM | 0 gal |
| 2. | 6:35AM – 6:48AM | 20-22 gal |
| 3. | 6:48AM – 7:05AM | 2-3 gal |
| 4. | 7:05AM – 7:28AM | 27-31 gal |
| 5. | 7:28AM – 7:58AM | 2.5-3.5 gal |
| 6. | 7:58AM – 6:05PM | 33-34 gal |
| 7. | 6:05PM – 9:15PM | 5.5-6 gal |
| 8. | 9:15PM – 9:40PM | 3-3.5 gal |
| 9. | 9:40PM – 10:15PM | 1-1.5 gal |
| 10. | 10:15PM – 11:59PM | 0 gal |

FIG. 13C

SYSTEM FOR UTILITY USAGE TRIGGERING ACTION

CROSS-REFERENCE TO RELATED APPLICATIONS

This application is a continuation of U.S. application Ser. No. 14/550,199, filed Nov. 21, 2014, which is hereby incorporated by reference in its entirety.

FIELD

The present disclosure relates to using sensors and measurements from sensors to trigger actions within a network. Specifically, various techniques and systems are provided for measuring usage, using sensors, of utilities, generating profiles based on the usage, and triggering actions within a network device based on the usage and profiles.

BRIEF SUMMARY

Embodiments of the present invention include, for example, a computer-implemented method. The method comprises compiling, by a network device on a network, historical usage data based on the use of a utility by the network device; generating a normal usage profile of the network device based on the compiled historical usage data; compiling current usage data based on the use of the utility by the network device over a predetermined time period; generating a current usage profile of the network device based on the current usage data; comparing the current usage profile to the normal usage profile; determining that the current usage profile is abnormal based on comparing the current usage profile to the normal usage profile; and updating the normal usage profile when the current usage profile is determined to be abnormal.

Alternative embodiments of the present invention include, for example, a computing device. The computing device comprises one or more processors; and a memory having instructions stored thereon, which when executed by the one or more processors, cause the computing device to perform operations. The operations include compiling, by a network device on a network, historical usage data based on the use of a utility by the network device; generating a normal usage profile of the network device based on the compiled historical usage data; compiling current usage data based on the use of the utility by the network device over a predetermined time period; generating a current usage profile of the network device based on the current usage data; comparing the current usage profile to the normal usage profile; determining that the current usage profile is abnormal based on comparing the current usage profile to the normal usage profile; and updating the normal usage profile when the current usage profile is determined to be abnormal.

Alternative embodiments of the present invention include, for example, a non-transitory computer-readable storage medium having instructions stored thereon. When executed by a computing device, the instructions cause the computing device to compile, by a network device on a network, historical usage data based on the use of a utility by the network device; generate a normal usage profile of the network device based on the compiled historical usage data; compile current usage data based on the use of the utility by the network device over a predetermined time period; generate a current usage profile of the network device based on the current usage data; comparing the current usage profile to the normal usage profile; determine that the current usage profile is abnormal based on comparing the current usage profile to the normal usage profile; and update the normal usage profile when the current usage profile is determined to be abnormal.

Alternative embodiments of the present invention include, for example, a computer-implemented method. The method comprises compiling, by a network device on a network, usage data based on the use of a utility by the network device; setting a threshold amount of usage based on the compiled usage data; determining a current usage amount at a current usage time; comparing the current usage amount to the threshold amount of usage; determining that the current usage amount has exceeded the threshold amount of usage; analyzing the usage data over a predetermined time period, wherein the predetermined time period occurred before or after or during the current usage time; and determining that, based on the exceeding of the threshold amount of usage and the analysis of the usage data over the predetermined time period, the network device should be deactivated.

Alternative embodiments of the present invention include, for example, a computer-implemented method. The method comprises compiling, by a network device on a network, usage data based on use of a utility by the network device; wherein the usage data is compiled over a predetermined time period; generating a usage profile of the network device based on the compiled usage data; determining that a current usage data is abnormal based on the usage profile; and transmitting a communication based on determination that the current usage data is abnormal, wherein when the communication is received, a state of the network device is changed, and wherein receiving the communication facilitates changing the state of the network device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 13B illustrates a table showing example profiles for a showerhead network device, according to example embodiments of the present invention.

FIG. 13C illustrates a table showing example profiles for a showerhead network device, according to example embodiments of the present invention.

DETAILED DESCRIPTION

Figure 1:
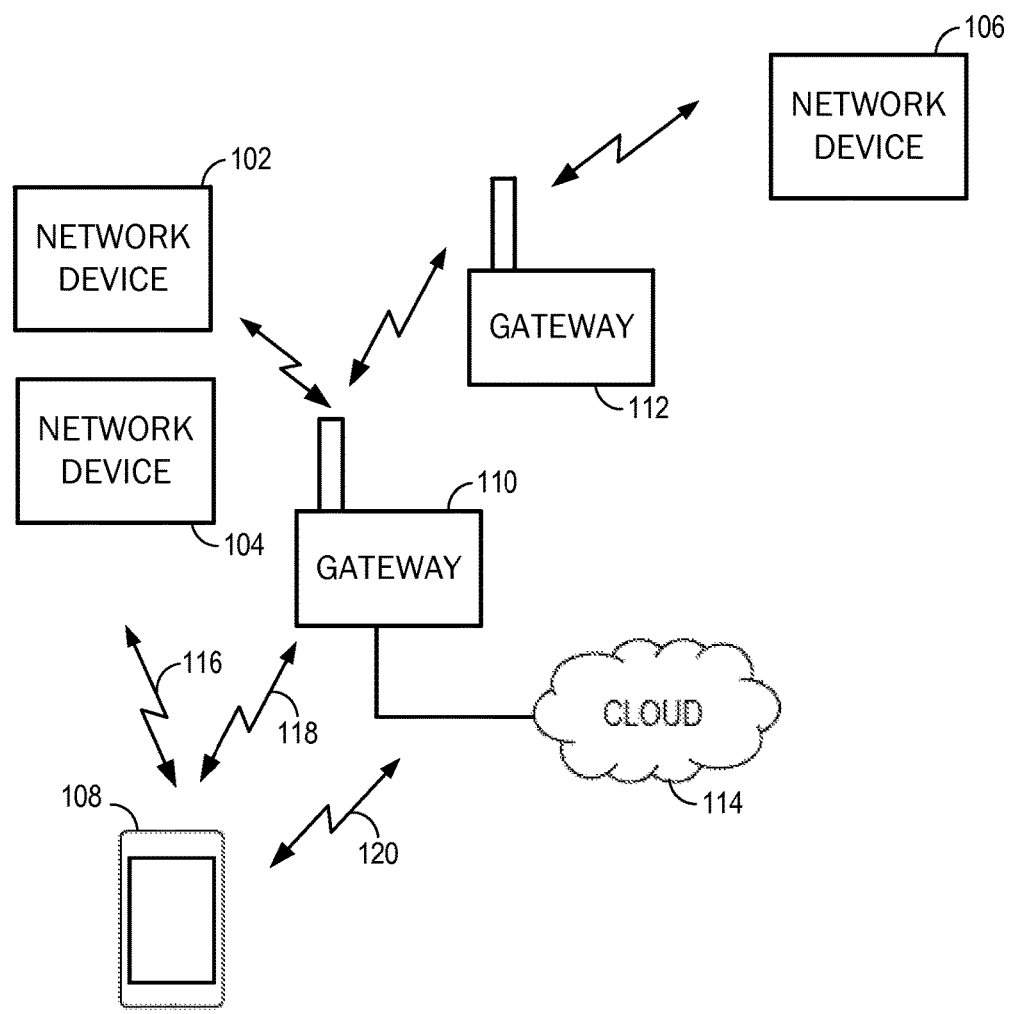
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium"includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
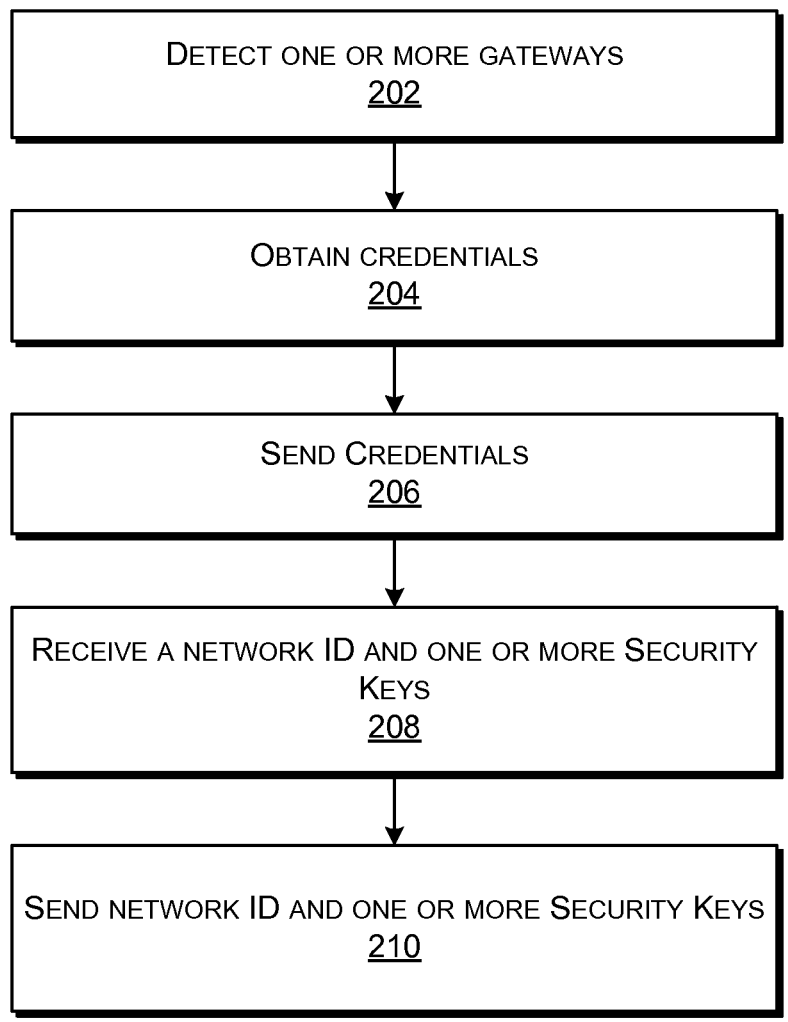
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
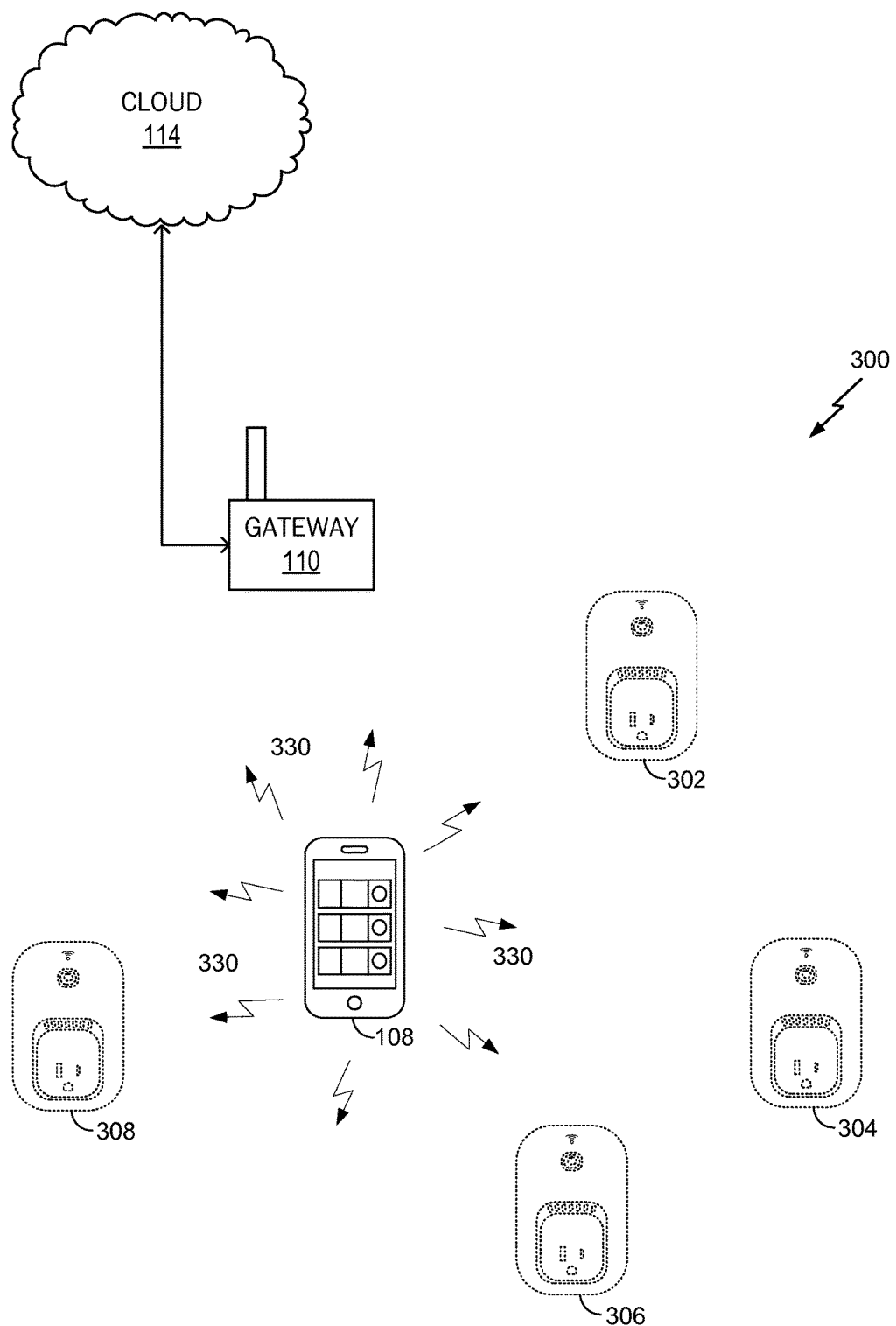
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
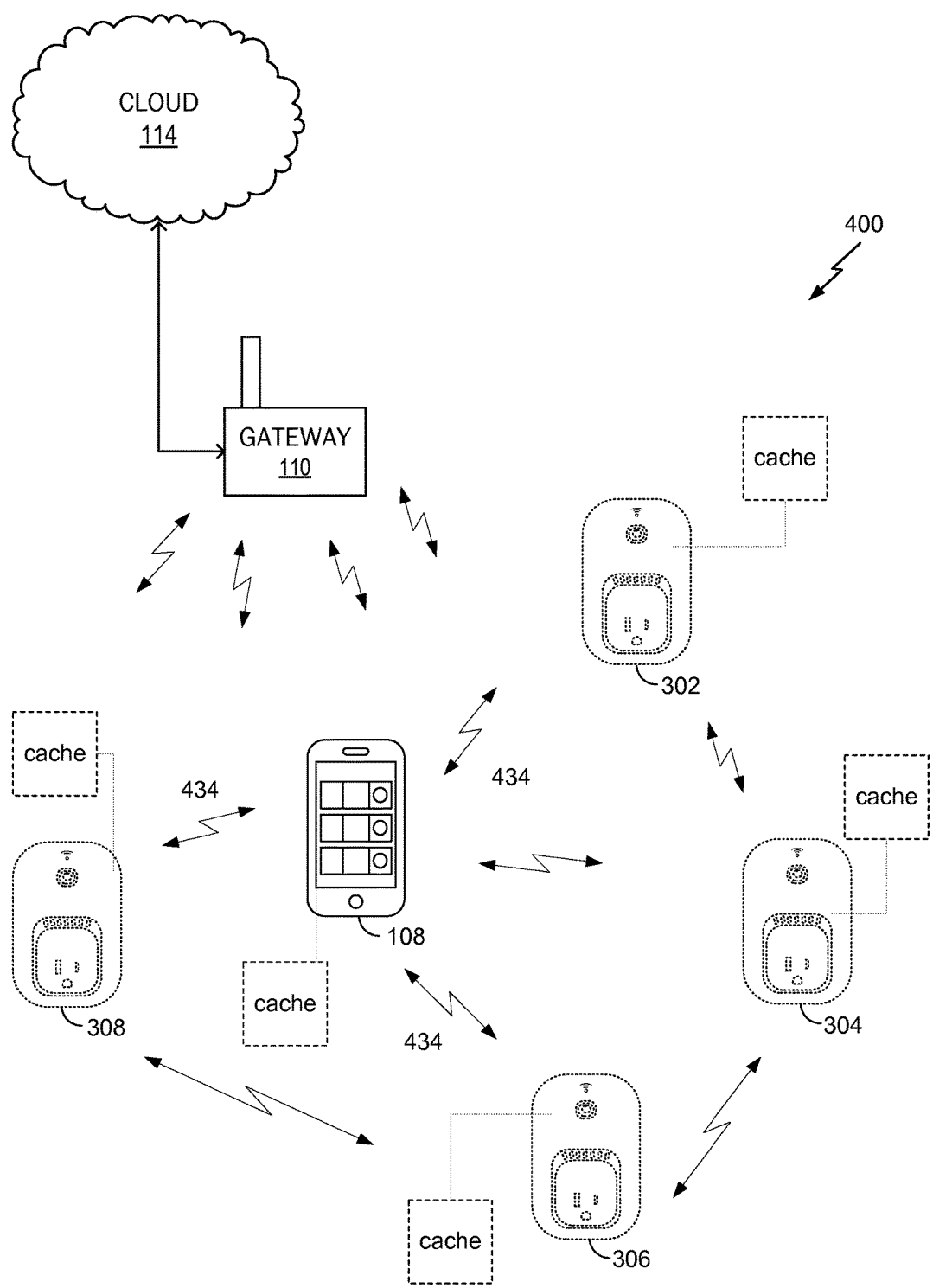
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
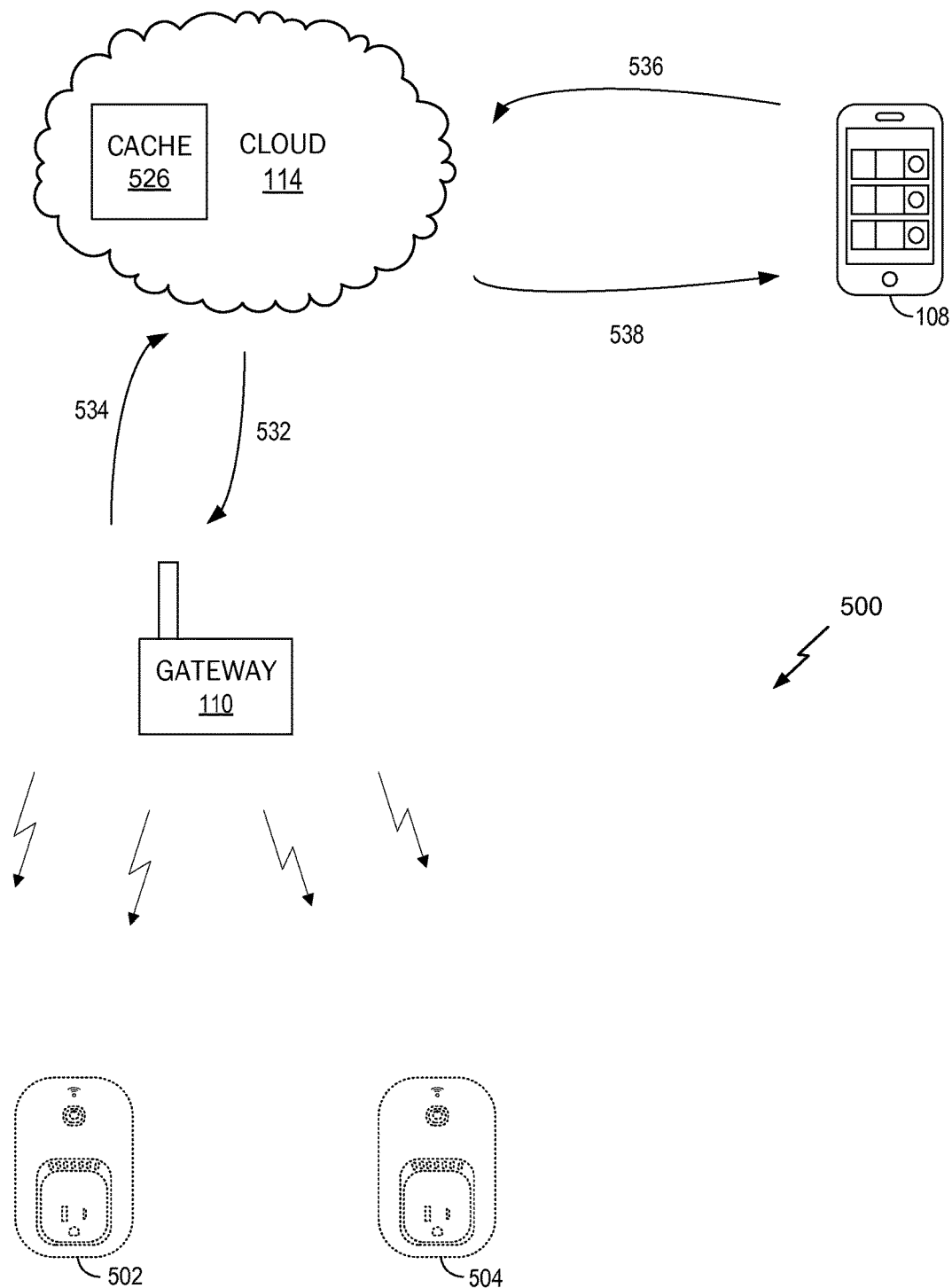
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
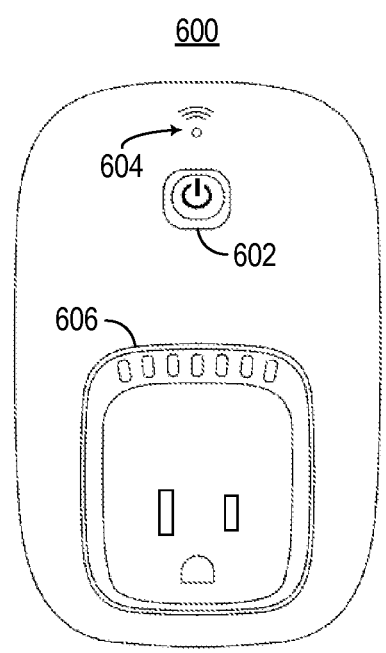
FIG. 6 is an illustration of an example of a front view of a network device, in accordance with an embodiment.
Figure 7:
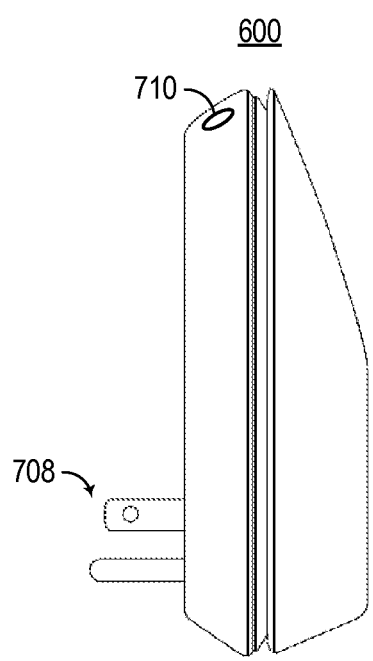
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
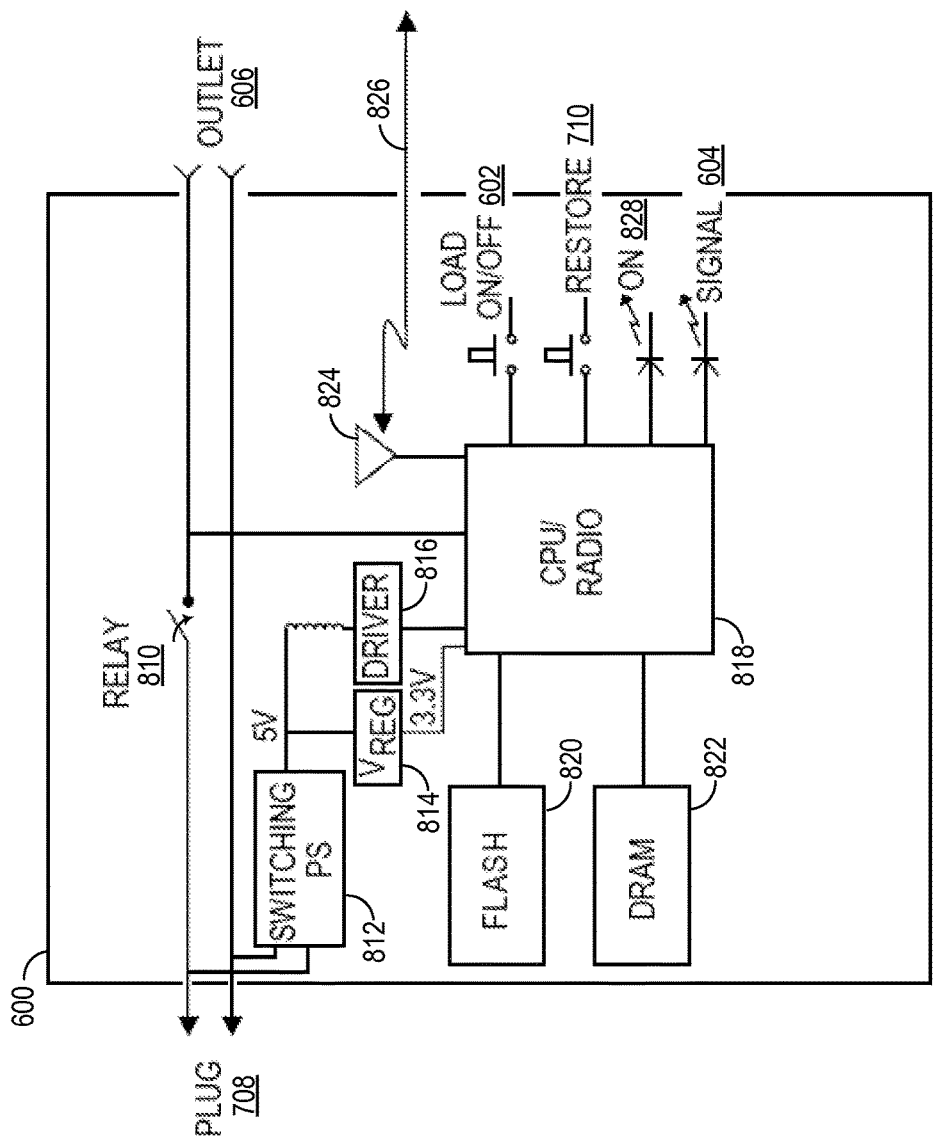
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 600 and/or might take the form of source and/or installable code, which, upon compilation and/or installation on the network device 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
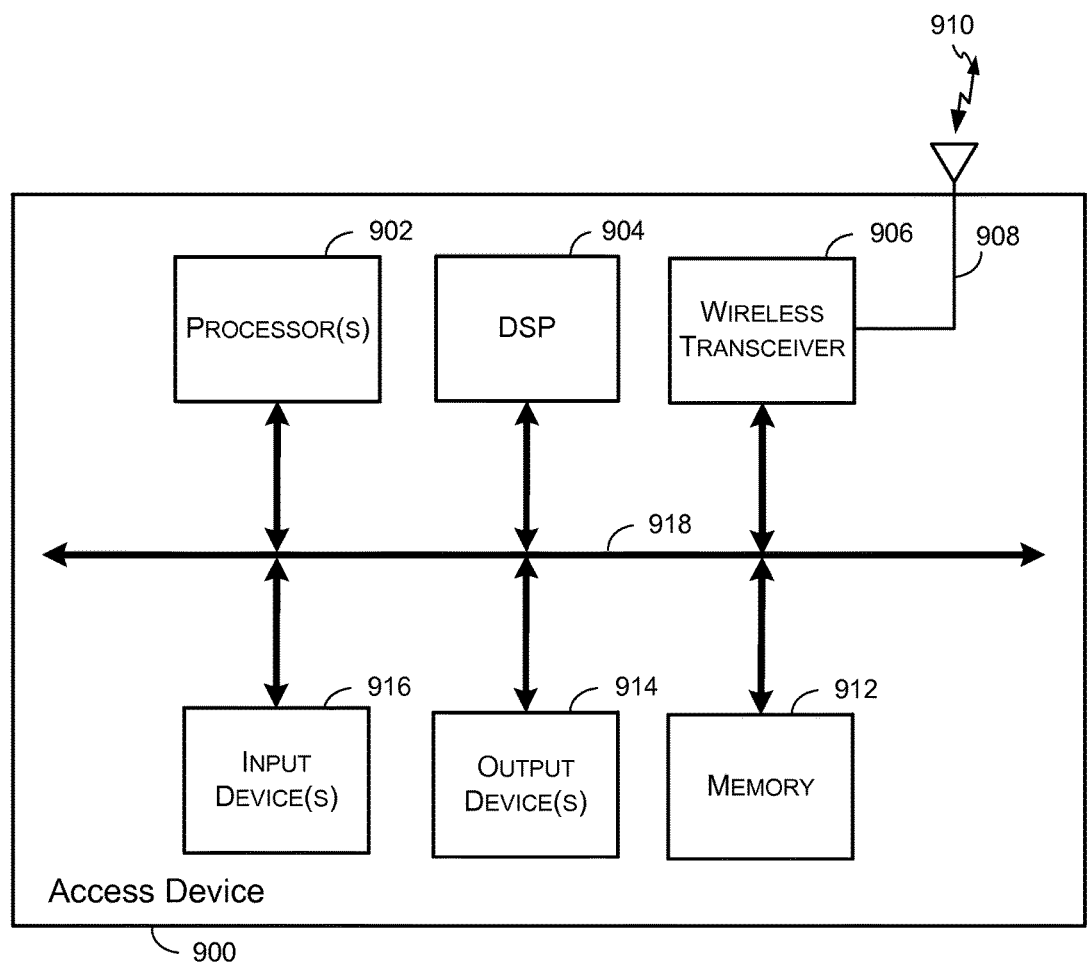
FIG. 9 is a block diagram illustrating an example of an access device, in accordance with some embodiments.

FIG. 9 illustrates an example of an access device 900. The access device 900 may include any human-to-machine interface with network connection capability that allows access to a network. For example, the access device 900 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 900 includes hardware elements that can be electrically coupled via a bus 918 (or may otherwise be in communication, as appropriate). In one embodiment, the bus 918 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like); one or more input devices 916, which can include without limitation a camera, a mouse, a keyboard, a touch sensitive screen, a touch pad, a keypad, and/or the like; and one or more output devices 914, which can include, without limitation, a display, a printer, and/or the like.

The access device 900 may include one or more wireless transceivers 906 connected to the bus 918. The wireless transceiver 906 may be operable to receive wireless signals (e.g., signal 910) via antenna 908. The wireless signal 910 may be transmitted via a wireless network. In some embodiments, the wireless network may be any wireless network including but not limited to a wireless local area network (e.g., local area network 100), such as WiFi, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceiver 906 may be configured to receive various radio frequency (RF) signals (e.g., signal 910) via antenna 908 from one or more gateways, network devices, other access devices, cloud networks, and/or the like. Access device 900 may also be configured to decode and/or decrypt, via the DSP 904 and/or processor(s) 902, various signals received from one or more gateways, network devices, other access devices, cloud networks, and/or the like.

The access device 900 may further include (and/or be in communication with) one or more non-transitory machine-readable storage mediums or storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 912, such as RAM, ROM, FLASH, or disc drive, and executed by processor(s) 902 or DSP 904. The access device 900 can also comprise software elements (e.g., located within the memory 912), including, for example, an operating system, device drivers, executable libraries, and/or other code, such as one or more application programs, which may comprise computer programs implementing various functions. Memory 912 may be a non-transitory machine-readable storage medium, processor-readable memory, and/or a computer-readable memory that stores the one or more computer-program products configured to cause the processor(s) 902 and/or DSP 904 to perform the various functions. In other embodiments, the various functions described may be performed in hardware.

Figure 10:
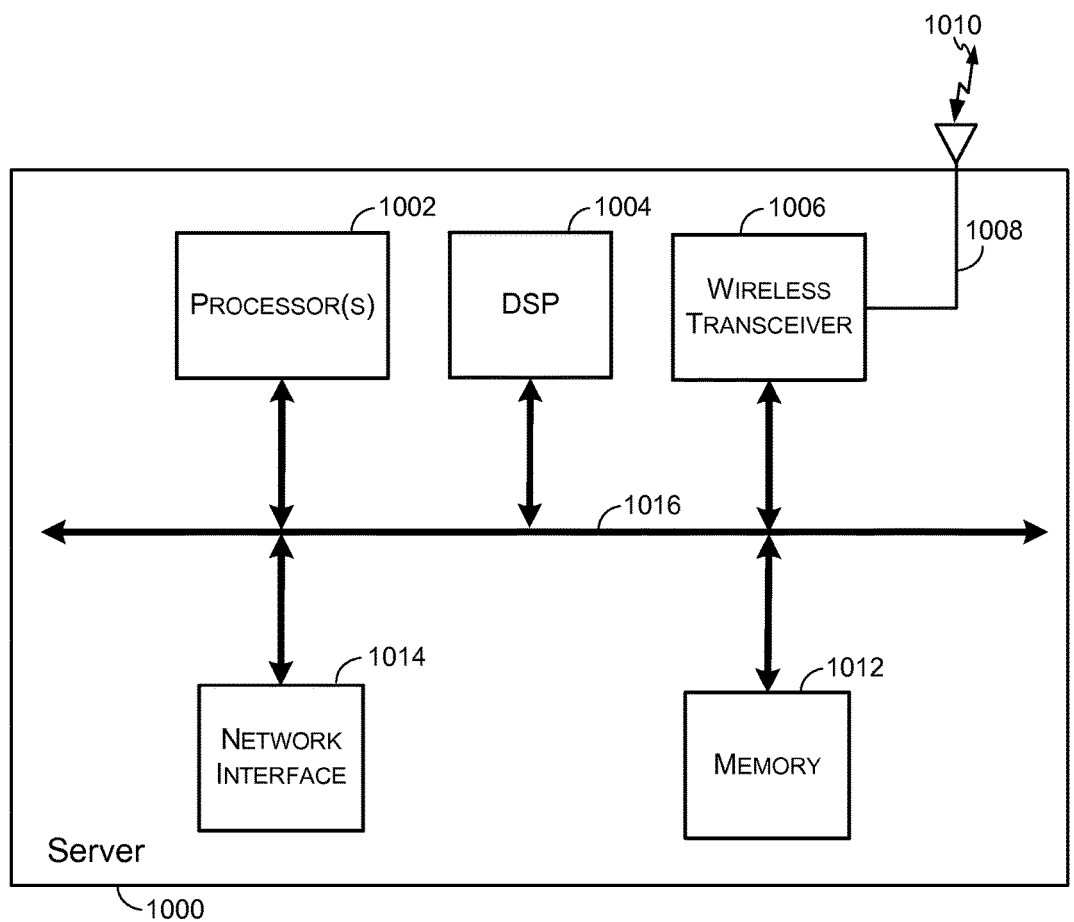
FIG. 10 is a block diagram illustrating an example of a server, in accordance with some embodiments.

FIG. 10 illustrates an example of a server 1000. The server 1000 includes hardware elements that can be electrically coupled via a bus 1016 (or may otherwise be in communication, as appropriate). In one embodiment, the bus 1016 can be used for the processor(s) 1002 to communicate between cores and/or with the memory 1012. The hardware elements may include one or more processors 1002, including without limitation one or more general-purpose processors and/or one or more special-purpose processors (such as digital signal processing chips, graphics acceleration processors, and/or the like), memory 1012, DSP 1004, a wireless transceiver 1006, a bus 1016, and antenna 1008. Furthermore, in addition to the wireless transceiver 1006, server 1000 can further include a network interface 1014 to communicate with a network (e.g., a local area network, a network of a preferred carrier, Internet, etc.).

The server 1000 may further include (and/or be in communication with) one or more non-transitory machine-readable storage mediums or storage devices (e.g., memory 1012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1012. The server 1000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1012 may be a non-transitory machine-readable storage medium, processor-readable memory, and/or a computer-readable memory that stores the one or more computer-program products configured to cause the processor(s) 1002 to perform the functions described. In other embodiments, one or more of the functions described may be performed in hardware.

A set of these instructions and/or code might be stored on a non-transitory machine-readable storage medium, such as the memory 1012. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1000 and/or might take the form of source and/or installable code, which, upon compilation and/or installation on the server 1000 (e.g., using any of a variety of generally available compilers, installation programs, compression/decompression utilities, etc.) then takes the form of executable code.

Figure 11:
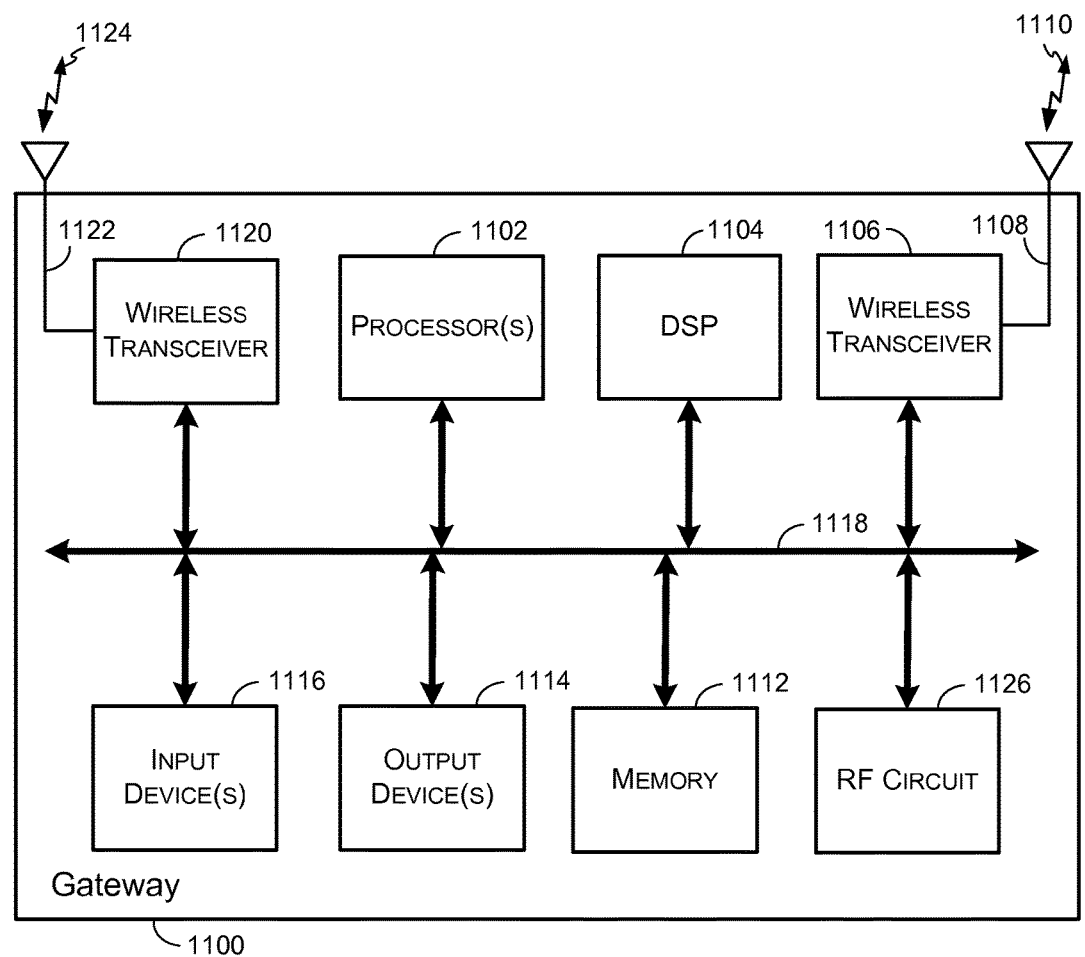
FIG. 11 is a block diagram illustrating an example of a gateway, in accordance with some embodiments.

FIG. 11 illustrates an example of a gateway 1100. The gateway 1100 may include a range extending device, a router, an access point, a modem, and/or any other device that provides network access among one or more computing devices and/or external networks. For example, the gateway 1100 may include a router gateway with access point and router functionality, and may further include an Ethernet switch and/or a modem. As another example, the gateway 1100 may include a range extending gateway that may be used to improve signal range and strength within a network by taking an existing signal from another gateway (e.g., a router gateway, an access point, or the like) and rebroadcasting the signal to create a second logical network.

The gateway 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116, which can include without limitation one or more buttons, a keyboard, a keypad, a touch sensitive screen, a touch pad, and/or the like; and one or more output devices 1114, which can include, without limitation, a display, light or sound indicators, and/or the like.

The gateway 1100 may include one or more wireless transceivers 1106 and 1120 connected to the bus 1118. The wireless transceiver 1106 may be operable to receive wireless signals (e.g., a wireless signal 1110) via an antenna 1108. The wireless transceivers 1120 may be operable to receive wireless signals (e.g., a wireless signal 1114) via an antenna 1122. The wireless transceivers 1106 and 1120 may each include a WiFi transceiver radio designed to transmit and receive signals using frequencies of a specific frequency band, which may be referred to herein as "WiFi circuits." For example, wireless transceiver 1106 may include a 2.4 GHz WiFi circuit, and wireless transceiver 1120 may include a 5 GHz WiFi circuit. Accordingly, the gateway 1100 may include a single WiFi circuit for a first WiFi frequency band, and a single WiFi circuit for a second WiFi frequency band. In some embodiments, the gateway 1100 may include multiple wireless transceivers (not shown) for each available frequency band. The antennas 1108 and 1122 may include multiple band antennas that can transmit and/or receive signals over different frequency bands.

The gateway 1100 may further include radio frequency (RF) circuit 1126. In some embodiments, the wireless transceivers 1106 and 1120 may be integrated with or coupled to the RF circuit 1126 so that the RF circuit 1126 includes the wireless transceivers 1106 and 1120. In some embodiments, the wireless transceivers 1106 and 1120 and the RF circuit 1126 are separate components. The RF circuit 1126 may include a RF amplifier that may amplify signals received over antennas 1108 and 1122. The RF circuit 1126 may also include a power controller that may be used to adjust signal amplification by the RF amplifier. The power controller may be implemented using hardware, firmware, software, or any combination thereof.

The wireless signals 1110 and 1124 may be transmitted via a wireless network. In some embodiments, the wireless network may be any wireless network including but not limited to a wireless local area network (e.g., local area network 100), such as WiFi™, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceivers 1106 and 1120 may be configured to receive various radio frequency (RF) signals (e.g., signals 1110 and 1124) via antennas 1108 and 1124, respectively, from one or more other gateways, access devices, network devices, cloud networks, and/or the like. Gateway 1100 may also be configured to decode and/or decrypt, via the DSP 1104 and/or processor(s) 1102, various signals received from one or more gateways, network devices, cloud networks, and/or the like.

The gateway 1100 may include a power supply (not shown) that can power the various components of the gateway 1100. The power supply may include a switch-mode power supply, a linear power supply, a push-pull power supply, or any other suitable type of power supply. In some embodiments, the gateway 1100 may include multiple power supplies. For example, a switch-mode power supply may be used to condition input power, and a linear power supply may be used to power the RF circuit 1126. The power supply may be configured to operate over various ranges of appropriate input voltages.

The gateway 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102 or DSP 1104. The gateway 1100 can also comprise software elements (e.g., located within the memory 1112), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 12-21, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 12-21. The memory 1112 may be a non-transitory machine-readable storage medium, processor-readable memory, and/or a computer-readable memory that stores the one or more computer-program products configured to cause the processor(s) 1102 to perform the functions described. In other embodiments, one or more of the functions described may be performed in hardware.

A set of these instructions and/or code might be stored on a non-transitory machine-readable storage medium, such as the memory 1112. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1100 and/or might take the form of source and/or installable code, which, upon compilation and/or installation on the gateway 1100 (e.g., using any of a variety of generally available compilers, installation programs, compression/decompression utilities, etc.) then takes the form of executable code.

Accordingly, techniques and systems are described herein for using sensors and measurements from sensors to trigger actions within a network. Specifically, various techniques and systems are provided for measuring usage, using sensors, of utilities (e.g. water, energy, gas, electricity, power, light, ink, etc.), generating profiles based on the usage, and triggering actions within a network device based on the usage and profiles. Alternatively, sensors may be used to take measurements other than for the use of a utility. For example, sensors may be used to measure the temperature read at a thermostat, carbon monoxide at a carbon monoxide detector, motion at a motion detector, smoke at a smoke detector, brightness of a light, or other measurements or objective measures within other types of control systems. This disclosure describes compiling historical usage based on the use or measurements detected by a network device and generating a usage profile based on that use or measurements. The usage profile may be considered "normal" because it is compiled from historical data that may indicate a pattern or consistent use by the user or users. The normal usage profile may be compared with the usage over a certain predetermined period of time to detect any abnormal use or measurements from the network device (e.g. the utility being used or detected by the network device). Any abnormal or other measured usage or current profile may be used to notify a user (e.g. via an access device) of the abnormality or may be used to take an action within the network (e.g. the network device). Examples of such actions include adjusting or turning off a network device, restricting access to the network by the network device, rejecting any attempts made by the network device to connect to any other network device, warning other devices on the same network or device(s) and/or services on the internet of the suspected abnormal behavior of the network device, among others. Furthermore, the profiles may be dynamically updated based on the detected use over time.

Figure 12:
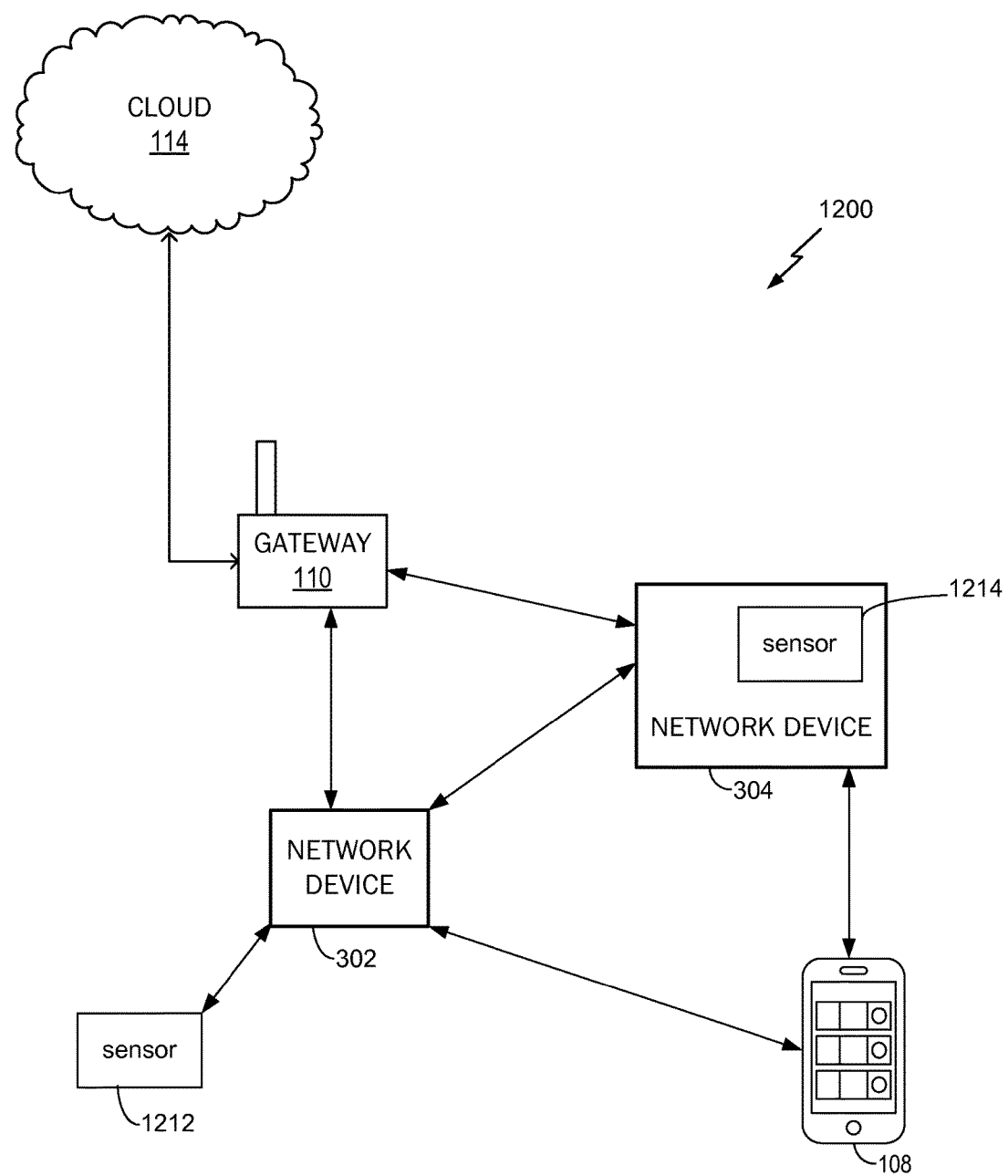
FIG. 12 illustrates an example of a network, according to embodiments of the present invention.

FIG. 12 illustrates an example of a network 1200, according to embodiments of the present invention. The network 1200 includes a gateway 110, a network device 302, a network device 304, and an access device 108. The network 1200 may also include a sensor, such as sensor 1212 or sensor 1214. A sensor may be external to, but connected to, a network device, such as sensor 1212 (which is connected or communicatively coupled to network device 302). Alternatively, a sensor may be included within a network device, such as sensor 1214 (which is a part of network device 304). Network devices 302 and 304 may be connected or communicatively coupled to gateway 110, to access device 108, and/or to each other. Examples of such connections or couplings are shown as arrows in FIG. 12.

A sensor, such as sensor 1212 or sensor 1214, may be any device that detects events or changes in events or quantities. Some different types of sensors may include sensors that detect or are sensitive to: light, motion, temperature, humidity, moisture, vibration, sound, gas, toxins, chemicals, nutrients, bodily functions or vitals, video surveillance, pressure, magnetic force, acceleration (e.g. by an accelerometer), orientation (e.g. by a gyroscope), IR, among many others. Sensors may be broken down into two different categories. First, a sensor may be a binary sensor. A binary sensor may only be able to detect or sense changes in a binary status. For example, a binary sensor may only be able to detect whether a network device or another type of device is on or off. However, a binary sensor may not be able to detect any other characteristics of such a device, such as variations or ongoing trends of the device. On the other hand, a sensor may be a sensor that is able to detect other characteristics of the device. For example, a sensor may be able to detect or sense variations in the device or environment being sensed. For example, a sensor may be able to detect the temperature in a room, or the trend of the temperature in a room over time. In another example, a sensor may be able to detect the level at which the dimmer of a light or light switch is set.

Although certain types of network devices and utilities may be described and/or used in examples or embodiments herein, any number of different network devices and utilities may be used within embodiments of the present invention A sensor, such as sensor 1212 or sensor 1214, may also provide an output, such as a notification or other communication, corresponding to the detected event or quantity (hereinafter collectively "event"). For example, after sensor 1214 detects something about network device 304 (e.g. that network device 304 is low on power), sensor 1214 may transmit a notification or other type of communication to another part of network device 304. In another example, after sensor 1212 detects something about network device 302 or about its environment (e.g. if network device 302 is a thermostat, sensor 1212 may detect that the temperature in the environment around sensor 1212 has changed), sensor 1212 may transmit a notification or another type of communication to network device 302. The sensor may also transmit a notification or other communication to other devices on the network or to external devices outside the network so that such devices know about the sensed condition. Network device 302 or 304 may also transmit a notification or other communication to other devices on the network or to external devices outside the network.

The output from a sensor corresponding to the detected event may be used for purposes other than to notify the network device (and, for example, a user or owner of the network device) that the detected event occurred. For example, the output from a sensor (e.g. a notification or other communication) may trigger an action by a network device (e.g. the network device that it is connected to or a part of, or another network device). For example, an output from sensor 1212, which includes an indication (or notification or other communication) of a detection of an event by sensor 1212, may trigger an action by network device 302.

An action by a network device, such as network device 302, may be triggered by a determination that one or more events detected by a sensor, such as sensor 1212, is abnormal. A sensor may monitor a network device or its surrounding environment over an extended period of time, and may collect/compile data related to the network device or its surrounding environment over that period of time. Alternatively, another device may compile the data collected while the sensor is monitoring the network device and/or its surrounding environment. The sensor may, therefore, compare that historical data over time, and/or other data determined or calculated from the compiled data, with data collected at any one point in time. In another example, the sensor may compare that historical data over time, and/or other data determined or calculated from the compiled data, with data collected over a shorter amount of time. Such comparisons may allow for the sensor to determine that the data from the point in time or shorter amount of time is abnormal compared to the historical data it collected. The comparisons, calculations, determinations, etc. described herein may also be performed by an entity other than the sensor itself. For example, they may be performed by a network device or a cloud network communicatively coupled to the sensor, or another entity. More specifically, a cloud network may aggregate patterns (e.g. average patterns) of similar or like devices from a particular location, region, country, or even globally. For example, the cloud network may aggregate patterns across every network device that it is connected to or has access to, or a subset of the set of network devices that it is connected to or has access to.

The historical data may be captured in multiple different ways. For example, a device usage profile may be generated based on the historical data. Such a profile may represent the use (or other characteristic) of a network device over a minute, an hour, a day, multiple days, a weeks, a month, a year, or a different amount of time. The usage profile may represent patterns or other indications of types of use of the utility/network device. For example, the profile may characterize the use of a thermostat network device each minute for an example week. Alternatively, one or more thresholds may be determined, where crossing the one or more thresholds are representative of an abnormal event based on the historical data, and data at a point in time may be compared to the one or more thresholds. These example embodiments of the present invention will be discussed in turn with respect to the following figures.

Figure 13A:
FIG. 13A illustrates a table showing example profiles for a showerhead network device, according to example embodiments of the present invention.

FIGS. 13A, 13B and 13C illustrate tables showing example profiles for a showerhead network device, according to example embodiments of the present invention. FIG. 13A illustrates a table 1300A, which includes a "normal" water profile for the showerhead. In other words, table 1300A includes a profile for the showerhead that may have been generated based on historical data taken by a sensor either within the showerhead network device or communicatively coupled/connected to the showerhead network device. The profile may be representative of the "normal", or average, use of water flowing through the showerhead over an extended period of time. The normal profile may allow an entity, such as the network device or any other device configured to analyze usage of the showerhead, to determine that usage of the showerhead is or has been abnormal.

Table 1300A includes time ranges that, when combined, span one full day, and a range of amounts of gallons of water associated with each time range. For example, the normal profile shows that between 12:00 AM and 6:35 AM, between 0 and 0.2 gallons of water flow through the showerhead. The range of 0.02 gallons may include the amount of water used each day (between 12:00 AM and 6:35 AM) for an extended period of time (e.g. the entire history of the sensor associated with the profile). Alternatively, the range may include only a subset of the amounts of water used each day for that extended period of time. For example, the range may only include frequently occurring amounts of water over that period of time, or may exclude outlier amounts of water used.

The profile may be divided up into a variety of different time ranges and/or a variety of different numbers of time ranges. For example, table 1300A includes 10 time ranges, but an alternative profile may include 8, 9, 11, 12 or any other number of time ranges. Furthermore, each time range may span any amount of time and may span any time of day. Furthermore, the profile may include time ranges that span, when combined, a larger or smaller amount of time than exactly one full day. For example, the time ranges in a profile may span one hour, two days, one week, or any other amount of time.

FIG. 13B illustrates a table 1300B, which includes a profile for Monday, Jan. 15 for the showerhead. FIG. 13C illustrates a table 1300C, which includes a profile for Monday, Jun. 15 for the showerhead. Each of tables 1300B and 1300C include "abnormal" data as compared to table 1300A. For example, table 1300B shows that 4.8 gallons of water were used between 12:00 AM and 6:35 AM, which is well outside the normal range of 0 through 0.2 gallons (as shown in table 1300A in FIG. 13A. Therefore, when a device (e.g. the sensor, the network device connected to the sensor, a cloud network, etc.) compares the water profile in table 1300B to the normal water profile in table 1300A, the device may conclude that an abnormal amount of water was used on Jan. 15 between 12:00 AM through 6:35 AM.

An example reason that the normal water profile for the showerhead indicates that only 0-0.2 gallons of water are used during 12:00 AM and 6:35 AM is that the owner of the showerhead may be sleeping during that time (since 12:00 AM-6:35 AM is a typical time for people to be sleeping. An increased number of gallons used during that time period may indicate to the system that the showerhead is being used abnormally during that time period on that day. For example, the system may conclude that, such an abnormal use may include unauthorized use or mistaken use of the shower or showerhead during that time. In another example, the system may conclude that, such an abnormal use may include a failure of the showerhead (e.g. a leak). If the system determines that to be the case, the device performing the analysis (e.g. the sensor) may transmit a communication to the showerhead network device to indicate to the showerhead network device that the showerhead should be turned off to prevent any further unauthorized or mistaken use. For example, the sensor or other device may determine that, based on the water usage data collected, that water flowed through the showerhead consistently over the period of time between 12:00 AM and 6:35 AM. The sensor may therefore determine that water was leaking out of the showerhead, and that the flow of water through the showerhead was unintended by its user or owner. For example, a user may have used the shower that ended just before 12:00 AM (or another specific time within the range) and left the water on such that it dripped from the showerhead starting at 12:00 AM (or the other specific time within the range). The sensor may, therefore, transmit a notification to the network device because of this determination.

However, abnormal use may not necessarily indicate a problem (e.g. unauthorized or mistaken use) that needs to be fixed. In other words, the sensor may determine (or another device may determine for the sensor) that an abnormal event has taken place, but the sensor may not subsequently transmit a notification or other communication to the network device because it is determined that the use of the network device, even if abnormal, was not unauthorized or not unintended. For example, table 1300B shows that 1.4 gallons of water were used between 10:15 PM and 11:59 PM. In comparing table 1300B to 1300A, the sensor (or another device) may determine that the showerhead is not usually used much if at all during that time period, and that the 1.4 gallons of water used during that time is abnormal. However, the sensor may also analyze and determine, based on the historical data it has collected, that the user of the showerhead network device always (or almost always or regularly) uses between 1.3 and 1.5 gallons of water when the user takes a shower. Therefore, the sensor may determine that the user took an abnormal shower later in the evening than the user normally does, but that the use was authorized.

Furthermore, the sensor may analyze the use of the showerhead between 12:00 AM and 6:35 AM and determine that that use was also authorized. For example, if, based on the collected data from Jan. 15, the use was over a very short period of time (as opposed to being consistent over a longer period of time, indicating a drip), the sensor may determine that the 4.8 gallons of water used during that time period was only used within a 3 minute subset time period between 12:00 AM and 6:35 AM. Such use may indicate to the sensor that the use was authorized and/or that the use was halted after the 3 minute time period expired. Therefore, the sensor may refrain from transmitting a notification or indication or other communication to the showerhead network device that the showerhead should be turned off.

Table 1300C in FIG. 13C also shows an abnormal use, for example between 7:58 AM and 6:05 PM. The normal profile, as shown in FIG. 13A, shows that the showerhead is usually used very little during that time period. Therefore, similar to the data shown in table 1300B, the use of 33-34 gallons of water may be determined to be an abnormal use. For example, the high use of water during that time period may indicate to the sensor that the showerhead is broken (e.g. that the showerhead is allowing water to flow at a high rate). Such a determination may cause the sensor to send a notification to the network device, and/or may cause the sensor to send a notification to the user directly (e.g. via an access device, such as access device 108 shown in FIG. 12). However, if the profile shown in table 1300C were for an outdoor spigot network device instead of a showerhead, the sensor may analyze the data and calculate that the 33-34 gallons used were used to water the grass by the sprinkler system connected to the spigot. If, for example, Jun. 15 is the first day of sprinkler usage, the sensor may come to such a conclusion using, for example, data from past years (e.g. if Jun. 15 or a day close to Jun. 15 showed data with a high amount of water usage, and such usage continued throughout the summer months).

Although a sensor (or another entity, such as a network device, cloud network, etc.) may analyze the current and/or historical data associated with usage of a utility and make determinations based on that analysis, the entity may also store predetermined profiles (e.g. "normal" profiles based on the type of device and/or the user(s) of the device), predetermined conclusions based on certain types of generated profiles, and predetermined notifications or other communications to be sent to a predetermined set of devices (e.g. network device, access device, etc.) based on the analyzed data and resulting conclusions. For example, a user (e.g. a manufacturer of a network device) may assign or store a predetermined "normal", "normal operating", or "abnormal operating" profile. Such predetermined profiles may allow for a comparison between a measured or recorded profile and a normal or abnormal limit profile. Such a predetermined profile may be used so that the user can be notified any time the use/status of the network device goes outside the parameters of the profile set by the user. For example, a user may want to be notified if another user is using more than a certain amount of water in the shower (including the showerhead). In another example, a user may choose a certain set of network and/or other devices for the sensor (or other device analyzing the sensor data) to which the user wants notifications sent. The user may also predetermine which devices should receive notifications for certain types of events, and for certain types of events for certain network devices.

As noted, one or more thresholds may be determined, where crossing the one or more thresholds are representative of an abnormal event based on the historical data, and data at a point in time may be compared to the one or more thresholds. In such an embodiment, the abnormal event, determined by current data crossing one or more thresholds, may trigger an event by, for example, a connected network device (e.g. turning the network device off). As compared to a profile (e.g. as described with respect to FIGS. 13A-13C), which may include a broad picture of the "normal" use of a device which may include a compilation of numbers and/or ranges, a threshold may be a single number or quantity.

Various different types of thresholds may be used in such an embodiment. For example, a threshold may represent a value that, when surpassed at any time, triggers a notification and/or an event. For example, a threshold for a thermostat network device may include a certain temperature that the user sets so that the user can be notified when the temperature in the home (as monitored by the sensor) drops below or raises above that threshold temperature. Alternatively, the thermostat network device may turn on/off the air conditioning or heat when the temperature drops below or raises above the threshold temperature.

In another alternative example, a threshold may combine a more complex pattern of usage that limits the number of threshold events within a given period of time. For example, for a device such as an engine or motor (or one that includes an engine or motor, such as in a car or blow dryer), a threshold may include that the engine or motor should not rev beyond 5 KRPM for a period of over 5 minutes. In another example, a threshold may include that the engine or motor should not rev more than 10 times above 5 KRPM over a contiguous 5 min time period. The example numbers used in these examples are examples only, and any other time periods or other amounts may be used or set (e.g. by a user or manufacturer), or may be changed dynamically by the device itself based on, for example, historically stored amounts. In other words, the thresholds may actually combine multiple thresholds or include a threshold with a contingency or condition that must be met before the threshold is considered met or surpassed.

In another example embodiment, a threshold may represent a total amount of a utility that is consumed or used over a certain predetermined period of time. For example, a threshold for a showerhead network device may include a certain amount of water that the user sets so that the user can be notified when the amount of water used (as monitored by the sensor) raises above the threshold amount of water.

Alternatively, the showerhead network device may turn off the flow of water through the showerhead when the amount of water raises above the threshold amount of water.

In another example embodiment, a threshold may be conditional. More specifically, a threshold may represent a value that, when surpassed, triggers a notification and/or an event, but only when an additional event takes place at the same time. For example, a threshold for a thermostat network device may include a certain temperature that the user sets so that the user can be notified when the temperature in the home (as monitored by the sensor) drops below or raises above that threshold temperature, but only if the temperature crosses the threshold at a certain time of day. In another example, a threshold for a showerhead network device may include a certain amount of water that the user sets so that the user can be notified when the amount of water used (as monitored by the sensor) raises above the threshold amount of water, but only if the threshold is surpassed before the 25$^{th}$ day of any given month. In another example, a threshold for a showerhead network device may include a certain amount of water that the user sets so that the user can be notified when the amount of water used (as monitored by the sensor) raises above the threshold amount of water, but only if the threshold is surpassed (from zero to the threshold) within a certain predetermined amount of time. For example, a condition may include that the trigger occur if a showerhead sensor senses that 28 gallons of water have flowed through the showerhead within a 3 hour span of time. Various other types of thresholds may also be possible according to embodiments of the present invention.

Figure 14:
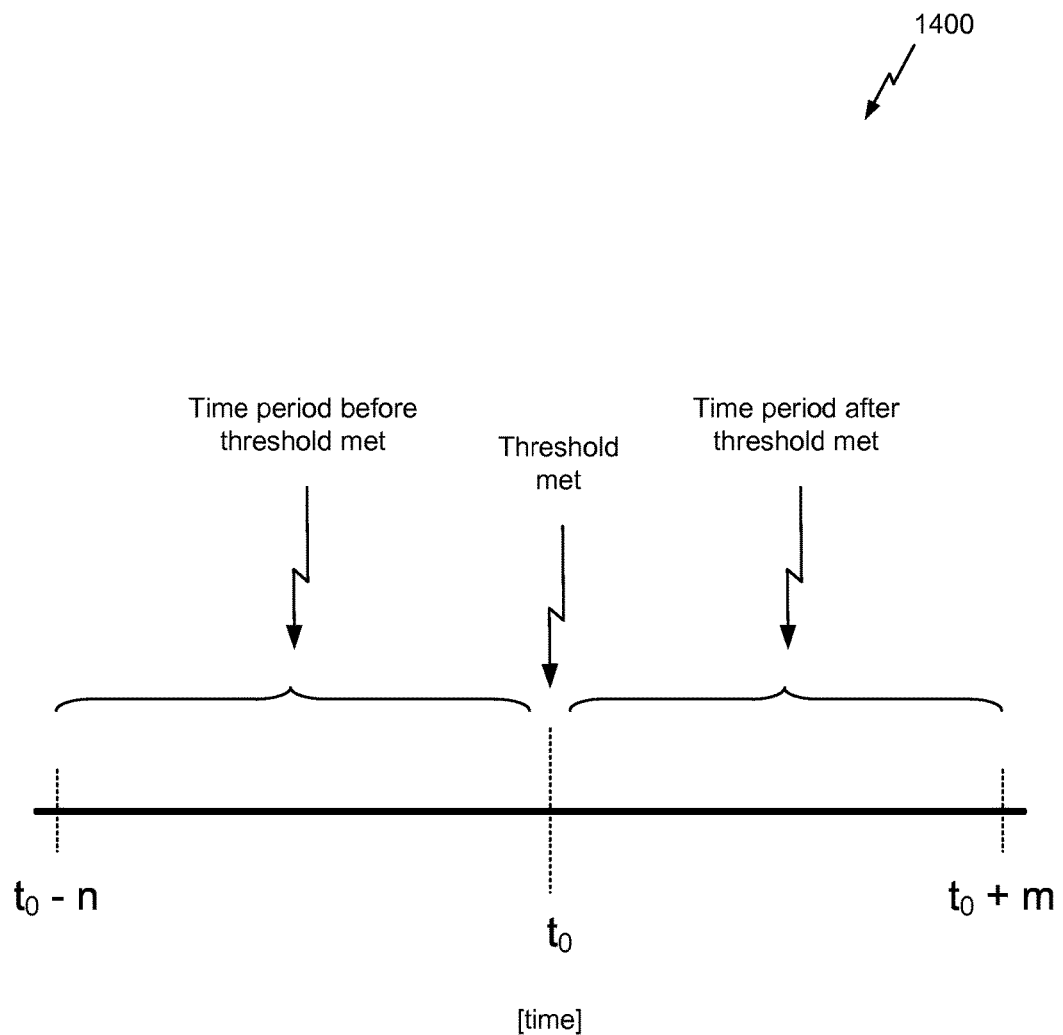
FIG. 14 illustrates an example timeline showing a time at which a threshold was crossed and periods of time before and after the threshold was crossed, according to example embodiments of the present invention.

FIG. 14 illustrates an example timeline 1400 showing a time at which a threshold was crossed and periods of time before and after the threshold was crossed, according to example embodiments of the present invention. Timeline 1400 includes three hash marks that represent three different points in time. One hash mark is at time $t_0$, which represents the time that a threshold is met. A second hash mark is at time $t_0-n$ which represents the beginning of a period (that ends at $t_0$) of time before the threshold is met. A third hash mark is at time $t_0+m$, which represents the end of a period of time (that begins at $t_0$) after the threshold is met.

Although, as noted, a trigger (to a notification/communication and/or another action by a network device) may be based on the crossing of a threshold, further analysis may also be performed before the trigger comes into effect. More specifically, the change in status of a network device may only warrant a triggered event if the change in status indicates certain types of trends before (leading up to) and/or after the change in status caused the threshold to be crossed. For example, a threshold could be set for a thermostat network device at 72 degrees such that the air conditioning may turn on after the threshold is crossed. However, if the sensed temperature dropped from 80 degrees to 71 degrees, the air conditioner may not be desirable because the trend of the temperature before the threshold was crossed is that the temperature was dropping. In an alternative example, if the sensed temperature dropped from 80 degrees to 71 degrees, the air conditioner may not be desirable if, for example, the temperature raises back up to 73 degrees immediately after the threshold was crossed.

Referring back to FIG. 14, the periods of time n and m may be analyzed to avoid unwanted triggers based on a sensor sensing the use/status of a utility that surpasses a predetermined threshold. For example, the period of time n, which took place directly before time $t_0$, the time when the threshold was exceeded, may be analyzed. More specifically, the period of time n may be analyzed to determine if, during the time between $t_0-n$ and $t_0$ (hereinafter "time period n"), the sensor sensed use/status of the network device (or use/status of a utility used by the network device) that is consistent (or not consistent) with the need to trigger an event by the network device. In other words, the time period n may be analyzed to conclude that the trend of the use/status of the utility before it exceeded the threshold is consistent (or not consistent) with the desire of the user for that exceeding of the threshold to trigger a desired event. For example, the network device (or sensor or other device) may determine that a use/status of a utility (e.g. electricity, water, etc.) gradually increased during time period n, indicating that such a trend will continue and that the triggered event is appropriate. More specifically, for example, a sensor connected to a crock pot network device may, based on recorded data, determine that the crock pot was using a certain amount of electricity (which may correspond to a certain temperature inside the crock pot) consistently over an entire 15 hour period (an example time period n). From this data, the sensor (or the network device) may determine that since the threshold of 15 hours was exceeded, the crock pot should be turned off. Alternatively, a sensor connected to a showerhead network device may determine that 28 gallons of water was used in a 3 hour period and the 28 gallon threshold was reached. However, the exceeded threshold may not be determined to be an appropriate trigger for turning off the shower head (i.e. the flow of water through the showerhead) because the showerhead had not been used for an hour and the showerhead had only been in use, at the time the trigger was reached, for 2 minutes. A similar analysis may be performed using data collected during the time period between $t_0$ and $t_0+m$ (hereinafter "time period m").

Variables originating from outside the sensor readings may also be considered when analyzing whether an exceeded threshold should cause a subsequent event by a network device. For example, such variables may include the current time of year, current time of day, current temperature, historical data received or recorded by the sensor or other sensors, among many others. For example, if a threshold for a sensor connected to a thermostat network device is set at 72 degrees and the current temperature, as recorded by the sensor, drops from 73 degrees to 71 degrees, the network device may choose not to turn the heat on if, for example, the temperature outside the home that includes the sensor is 95 degrees. For example, the sensor may determine that the temperature throughout the room or the house did not actually drop from 73 degrees to 71 degrees, and instead an alternative situation caused such a temperature drop next to the sensor (e.g. a fan blew directly on the sensor for a few seconds).

Figure 15A:
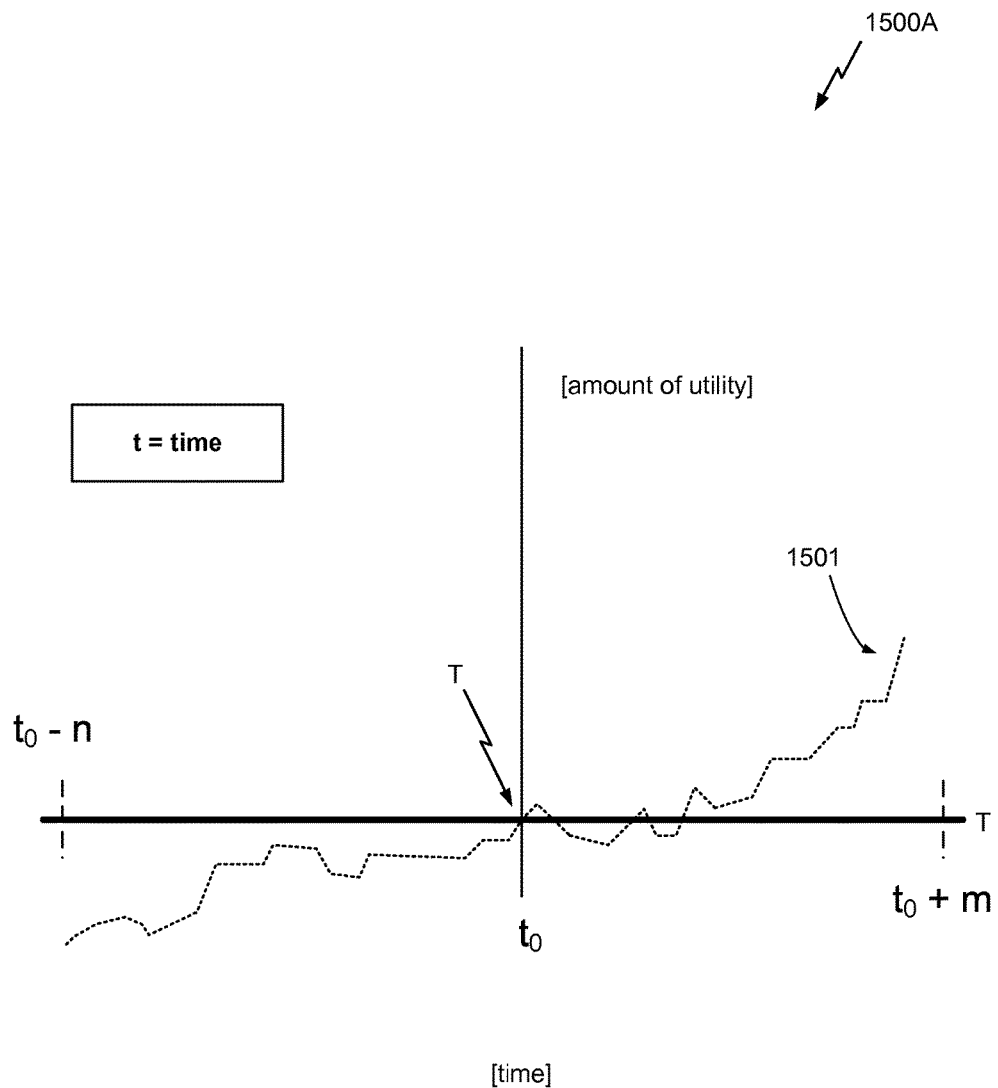
FIG. 15A illustrates a graph illustrating the use or status or status of a utility over time, according to embodiments of the present invention.
Figure 15B:
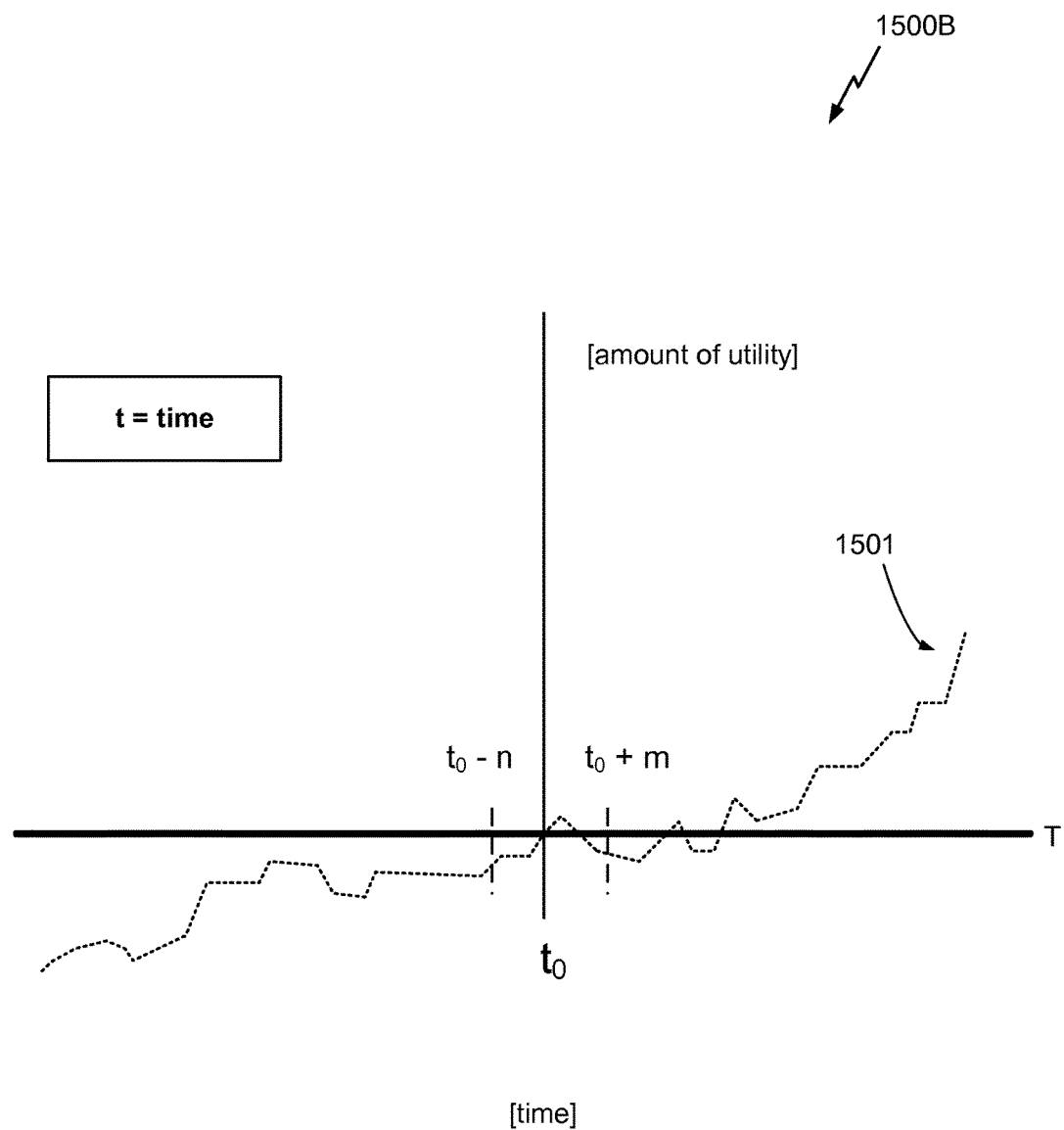
FIG. 15B illustrates a graph illustrating the use or status or status of a utility over time, according to embodiments of the present invention.

FIGS. 15A and 15B illustrate graphs illustrating the use/status or status of a utility over time, according to embodiments of the present invention. FIG. 15A illustrates a graph 1500A showing the use of a utility over time from $t_0-n$ to $t_0+m$, according to embodiments of the present invention. The axes of the graph include the amount of the utility on the y-axis and time on the x-axis. As shown by graph 1500A, between time $t_0-n$ and time $t_0$, the use of the utility increases from an amount less than the threshold T (as represented by the amount of utility at the x-axis line) to the amount of the threshold T. Between time $t_0$ and $t_0+m$, the use/status of the utility increases from an amount equal to the threshold T to an amount greater than the threshold T. However, between time $t_0$ and $t_0+m$, the use/status of the utility increases from the amount of the threshold T to an amount more than the threshold T, and then to an amount less than the threshold T, and then to an amount more than the threshold T, and again to an amount less than the threshold T before increasing to an amount more than the threshold T permanently. If a network device (or other device) did not analyze the time period after the utility exceeded the threshold T before allowing the exceeded threshold to trigger an event, then an event would be triggered five times in a very short amount of time. Such a situation may cause damage to the network device, may cause discomfort or other unwanted situations for a user of the network device, among many other possible undesirable situations. In other words, the fluctuation of the use/status of a utility around the amount of threshold T may cause such undesirable situations. For example, if a thermostat network device has a threshold T of 72 degrees, and the temperature sensed by a sensor connected to the network device senses a temperature in consecutive minutes of 71.9. 72.0, 71.7, 72.3, 71.8, 72.1, 71.9 and 72.5, the surpassed threshold may trigger an event 7 times in a short amount of time (e.g. 5-7 minutes or less).

Such situations may be prevented by integrating analysis of the time period n and/or the time period m into the process of deciding whether or not to trigger an event based on a surpassed threshold. Example methods of such analysis are described herein with respect to FIG. 14. For example, the analysis may include an analysis of the utility amounts at $t_0-n$ and at $t_0+m$ as shown by hash marks in FIG. 15A. However, only analyzing certain points in time before the time that the amount of utility exceeded the threshold T may lead to inconsistent analysis. Therefore, analysis may be performed on sub-periods of time before and/or after threshold time $t_0$. FIG. 15B illustrates a graph 1500B showing the use of a utility over time from $t_0-n$ to $t_0+m$, according to embodiments of the present invention. Graph 1500B is similar to graph 1500A, except that times $t_0-n$ and $t_0+m$ in graph 1500B are at different times than in graph 1500A. More specifically, times $t_0-n$ and $t_0+m$ in graph 1500B are at times closer to threshold time $t_0$. With respect to the particular plot 1501 showing the illustrated amount of utility over time, analysis of times $t_0-n$ and $t_0+m$ in graph 1500B would reveal more useful information than at times $t_0-n$ and $t_0+m$ in graph 1500A because time $t_0+m$ in graph 1500B reveals that the amount of utility decreased, after increasing to surpass the threshold T, to below threshold T. This conclusion may cause the sensor to refrain from sending a notification or other communication to the network device as a trigger to tell or cause the network device to perform an event.

Although the process of analyzing a period of time before and a period of time after a threshold is reached has been described herein with respect to thresholds, the same or similar processes may be applied to the embodiments using profiles (e.g. normal and current profiles) as described with respect to FIGS. 13A-13C.

Figure 16:
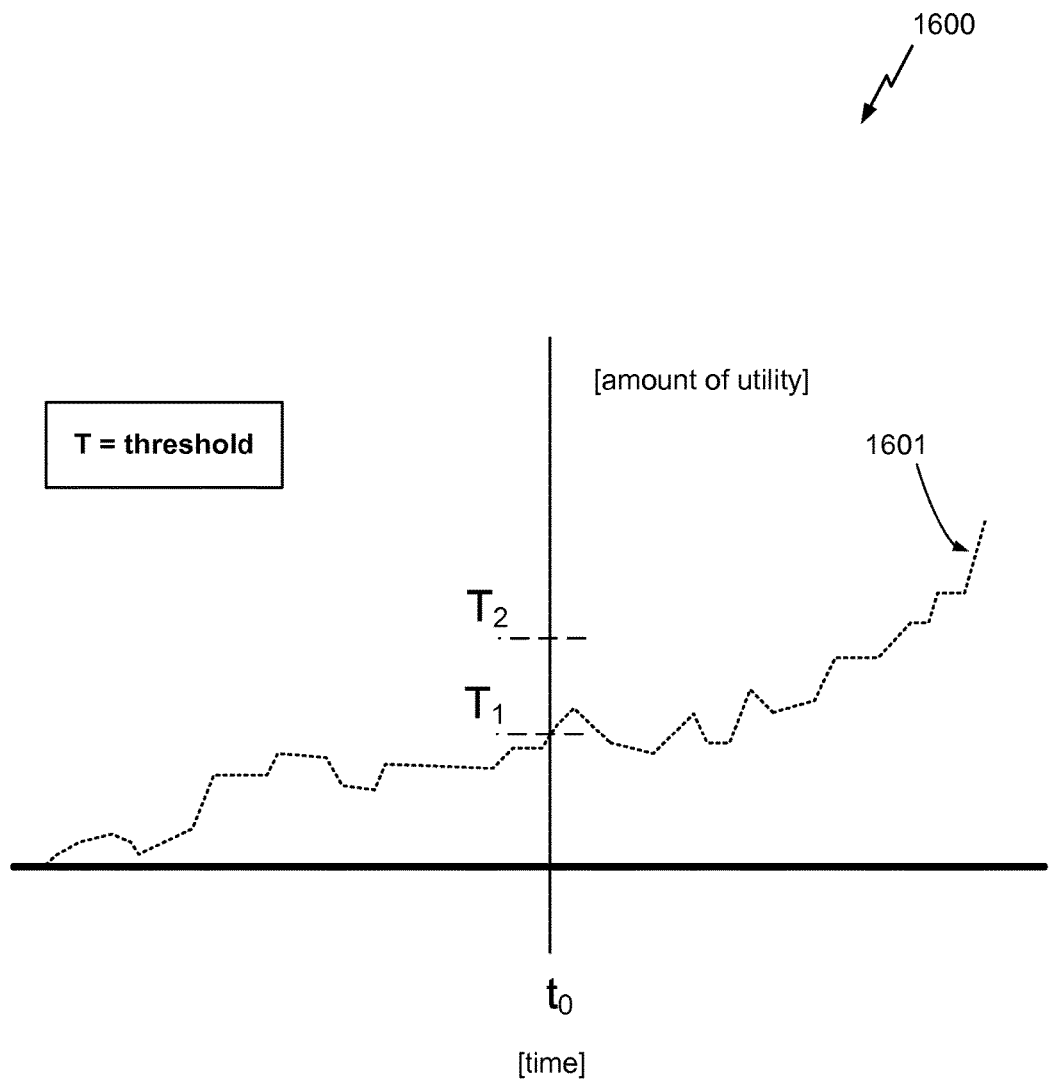
FIG. 16 illustrates a graph 1600 showing the use of a utility over time, according to embodiments of the present invention.

FIG. 16 illustrates a graph 1600 showing the use of a utility over time, according to embodiments of the present invention. The graph 1600 includes a plot 1601 of amount of utility over time similar to the plots 1501 in graphs 1500A and 1500B. Graph 1600 also includes two hash marks on the y-axis (amount of utility), which represent two thresholds, $T_1$ and $T_2$. Multiple thresholds, as shown in graph 1600, may also be used as a mechanism to ensure that analysis of the utility usage before and/or after a threshold, such as $T_1$, is met. Threshold $T_1$ may be similar to threshold T in FIGS. 15A and 15B. In other words, threshold T may be a predetermined threshold that, when crossed or exceeded, is representative of an abnormal event and may trigger an event by, for example, a connected network device. $T_2$, on the other hand, may be used as a second threshold to confirm that the amount of utility continues to increase (e.g. on its previous trend of increasing as of the time it crossed the threshold $T_1$).

As shown in graph 1600, plot 1601 exceeds threshold $T_1$ at time $t_0$, but then dips below threshold $T_1$ after time $t_0$ two times before remaining above threshold $T_1$. In this embodiment of the present invention, the fact that the amount of utility exceeded threshold $T_1$ may not cause a trigger, due to the exceeding of threshold $T_1$, because the amount did not exceed the second threshold, $T_2$. $T_2$ may be set a certain predetermined amount above threshold $T_1$, given the nature of the utility involved, such that the system can be reasonably sure that once the amount of utility exceeds threshold $T_2$ that it will not subsequently drop below threshold $T_1$ again.

In an alternative embodiment, instead of using a second threshold, the system may implement a pause or a delay after a threshold has been exceeded before a notification or other communication is sent to the connected network device. Such a delay or pause may allow the sensor to verify that the threshold is exceeded for a certain predetermined amount of time, and to verity that the threshold did not drop below the threshold amount in that predetermined amount of time. Such a delay may allow the system to gain confidence that the amount of utility will maintain a level above the threshold level and will not drop below the threshold level for at least an extended period of time. If the recorded/monitored amount of utility remains above the threshold level throughout the delay period, then the sensor may transmit a notification or other communication to the network device to trigger an event by/at the network device. Such a pause or delay may also take place at the network device itself (or by a cloud network or another device or network that is performing the data analysis with the data received from the sensor). In other words, for example, the sensor may transmit a notification to the network device immediately upon sensing that the threshold was passed, but the trigger may not cause an event at the network device until after the delay or pause has lapsed.

Figure 17:
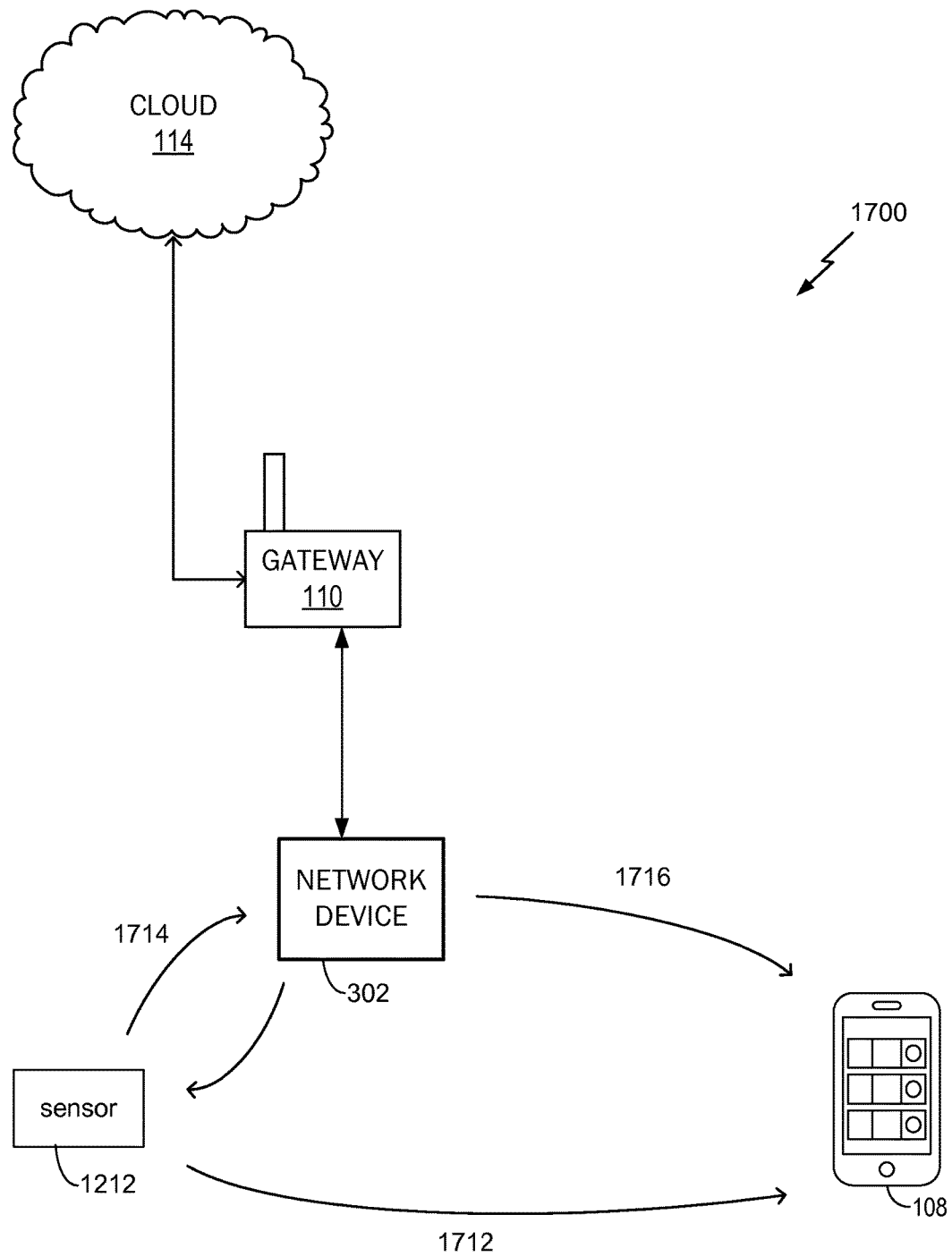
FIG. 17 illustrates a network including a network device, a sensor and an access device, according to embodiments of the present invention.

As noted, a determination that an abnormal event has occurred (using a comparison with a normal profile or with a threshold, for example) may cause the sensor to send a notification to the user directly. FIG. 17 illustrates a network 1700 including a network device, a sensor and an access device, according to embodiments of the present invention. As noted, a sensor, such as sensor 1212, may provide an output, such as a notification or other communication, corresponding to the detected event. For example, after sensor 1212 detects an event about network device 302 or about its environment, sensor 1212 may transmit a notification or another type of communication to devices on the network or to external devices outside the network so that such devices know about the sensed condition. This notification may be transmitted, for example, to access device 108 via transmission path 1712 as shown in FIG. 17. Network device 302 may also transmit a notification or other communication to other devices on the network or to external devices outside the network. This notification may be transmitted, for example, to network device 302 via transmission path 1714. Network device 302 may then transmit the notification, or a separate communication indicative of the notification, to access device 108, for example via transmission path 1716.

Furthermore, the output from a sensor (e.g. a notification or other communication) may trigger an action by a network device (e.g. the network device that it is connected to or a part of, or another network device). For example, an output from sensor 1212, which includes an indication (or notification or other communication) of a detection of an event by sensor 1212, may trigger an action by network device 302. For example, the triggered action may include that the network device turn off (or on). Alternative triggered actions may include the adjusting of a setting within network device 302. However, various other triggered events are possible. Furthermore, the triggered event may be suggested, as opposed to caused, by the communication or other trigger from the sensor or network device. For example, user authorization or approval may be required for the suggested event to take place.

After a communication has been received by access device 108, access device may display information representative of the notification or other communication on a display within the access device 108. For example, the access device may display information related to the utility usage, the utility usage compared to a threshold, the normal and/or current usage profiles, or any other information related to the network device and/or sensor connected to the network device. The access device 108 may also display a one or more queries for the user to respond to a suggested (conditionally) triggered event as received from the sensor or network device.

Figure 18:
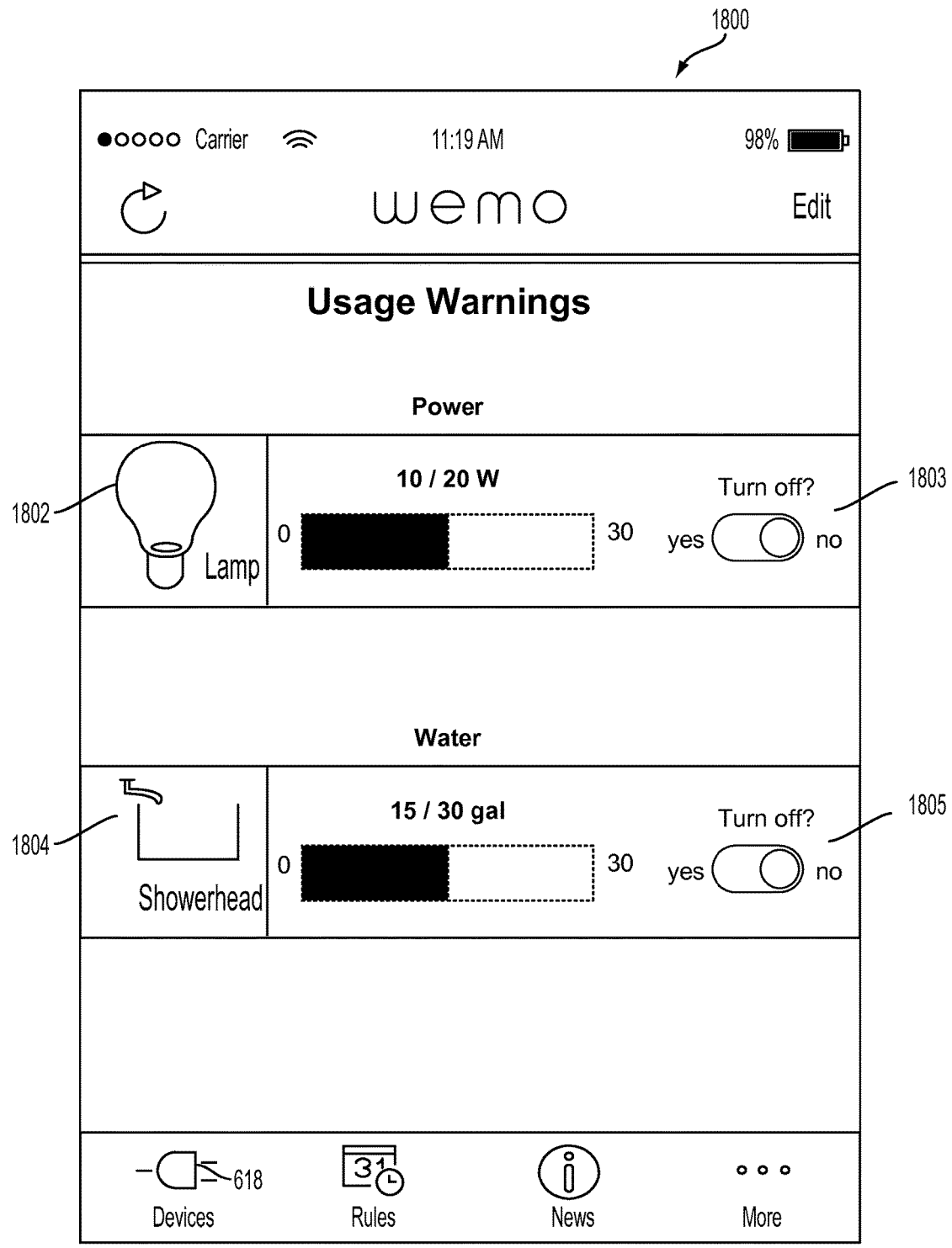
FIG. 18 illustrates example embodiments of a screenshot of an example user interface (UI) display for an application on an access device, according to embodiments of the present invention.

FIG. 18 illustrates example embodiments of a screenshot of an example user interface (UI) display for an application on an access device, according to embodiments of the present invention. However, the example UIs are not limited to these example embodiments. In an embodiment of the invention, the visual interface illustrated in FIG. 18 is displayed on a mobile computing device, which can have a touch sensitive (i.e., touch screen) display device. For ease of explanation, the monitoring and control operations discussed below with reference to FIG. 18 are described in the context of an application executing on an access device 108 with a touch-screen display device. However, the operations are not intended to be limited to the example device shown in FIG. 18. It is to be understood that the user interface illustrated in the example embodiment of FIG. 18 can be readily adapted to be rendered on displays of a variety of computing device platforms running a variety of operating systems. In FIG. 18, a display is shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 18 illustrates an example user interface display 1800 for an application on an access device, according to embodiments of the present invention. FIG. 18 discloses a list of usage warnings, including a power usage warning for lamp network device 1802 and a water usage warning for shower/showerhead network device 1804. Display 1800 may display identification information related to the network device and usage information/data related to the network device that is relevant to the usage warnings. In other words, display device 1800 may display information relevant for the user to be informed about the state or status of the network device. As noted, the display device 1800 may also display information related to predetermined thresholds, network device profiles, among other related information.

The display may also show any information related to the usage or usage warnings for the network devices to make an informed decision about how to react to the usage warnings. The display may, therefore, show an optional button to allow the user to react to the warning, including causing an event at the network device. For example, display 1800 includes slide buttons 1803 and 1805 to allow the user to turn off (an example network device event) the lamp network device 1802 and/or showerhead network device 1804, respectively. However, various other buttons that may cause various other events at the network device are possible.

Figure 19:
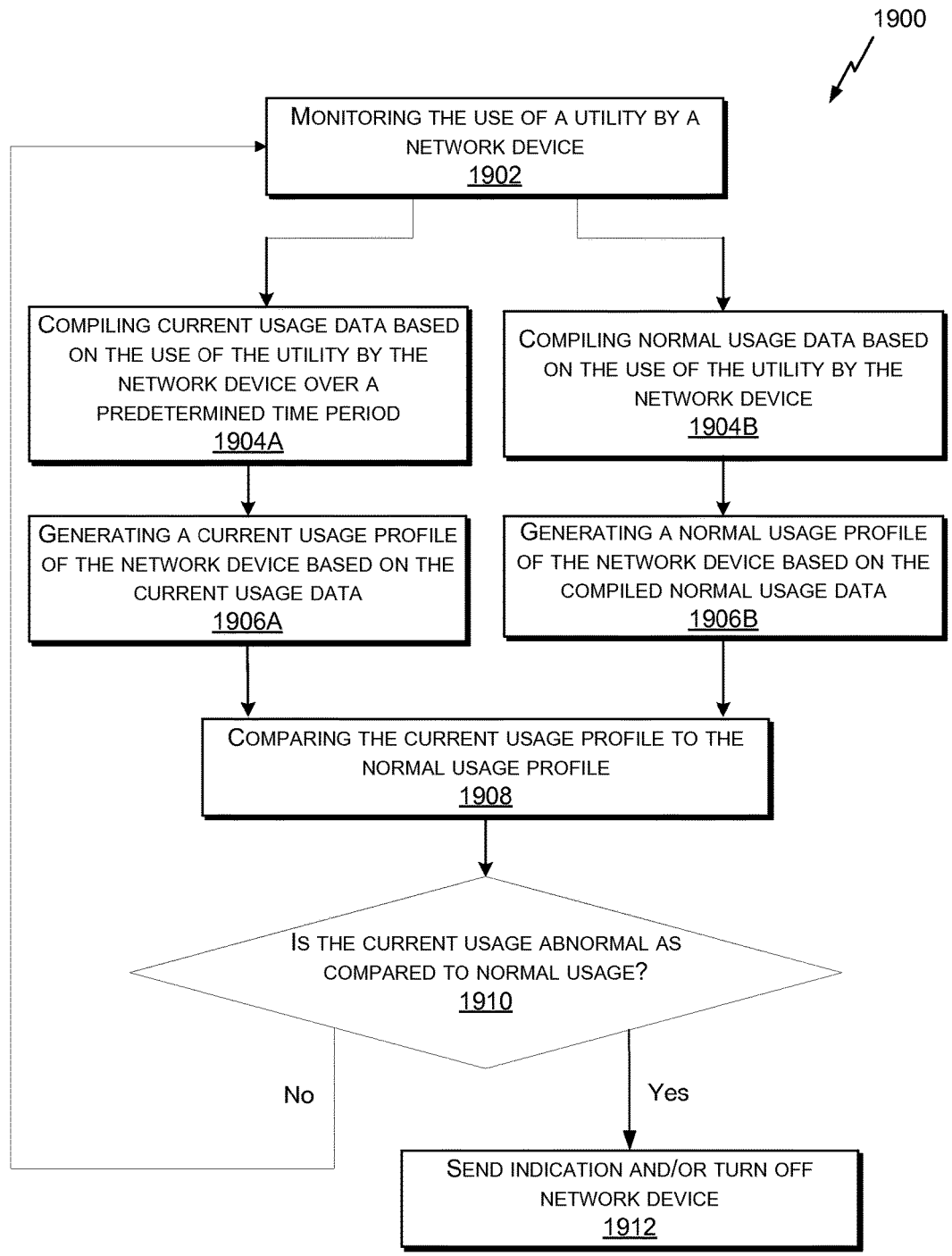
FIG. 19 is a flow chart showing an example process for a network to detect an abnormal event and to trigger an event at a network device using an indication representative of that abnormal event, according to embodiments of the present invention.

FIG. 19 is a flow chart 1900 showing an example process for a network to detect an abnormal event and to trigger an event at a network device using an indication representative of that abnormal event, according to embodiments of the present invention. Step 1902 includes monitoring the use of a utility by a network device. This step is optional because step 1904A or 1904B may occur before the use is actually "monitored" over a period of time. Step 1904A includes compiling current usage data based on the use of the utility by the network device over a predetermined time period. In other words, the network device may monitor the use of a utility, either within our outside of the network device, and compile or collect data based on that usage. Step 1906A includes generating a current usage profile of the network device based on the current usage data. In that step, the compiled usage data may be analyzed and turned into a usage profile that may define what usage of that utility looks like during that predetermined period of time. That time period may include less than a second, several seconds, several minutes, or much longer.

Step 1904B includes compiling normal usage data based on the use of the utility by the network device, and step 1906B includes generating a normal usage profile of the network device based on the compiled normal usage data. Step 1904B is similar to step 1904A except step 1904B may include compiling usage data over the history of the network device or of use of the utility so as to define what the usage of the utility looks like over a longer period of time. In other words, compiling normal usage may include compiling data over a long enough period of time to see a pattern of usage so that a "normal" usage profile may be defined, as in step 1906B. In that step, the compiled usage data may be analyzed and turned into a usage profile that may define what "normal" usage of the utility is over that period of time.

Step 1908 includes comparing the current usage profile to the normal usage profile. In this step, the usage profile generated in step 1906A is compared to the usage profile generated in step 1906B. More specifically, the usage profile generated from data collected over a predetermined period of time is compared to the "normal" usage data, or historical usage data, to determine if the profile from the predetermined time period is normal or if it is abnormal. This determination is queried in step 1910, which asks whether the current usage abnormal as compared to normal usage.

If the answer to the query in step 1910 is "yes", then the process proceeds to step 1912. Step 1912 includes sending an indication or turning off the network device. This step is performed because if the current usage is deemed abnormal, the network device can notify the user or owner of the network device to tell the user that something is wrong, or can take action on its own and turn off the network device. Various other actions are possible, such as adjusting the network device in some way (e.g. turning the utility up or down, etc.). On the other hand, if the answer to the query is "no", then the process proceeds back to step 1902 (or, alternatively, to step 1904A or 1904B) and to monitoring of the utility by the network device.

Figure 20:
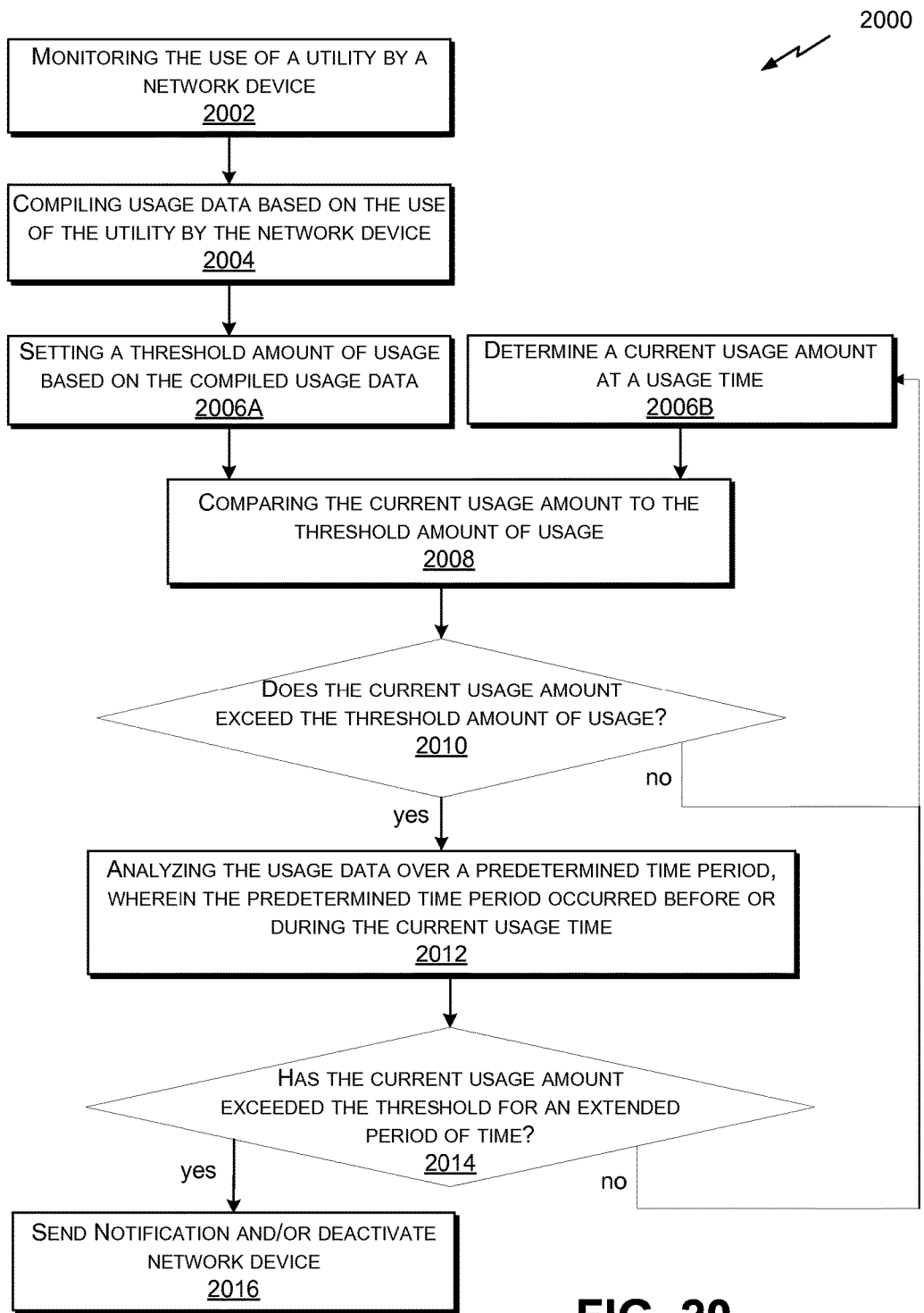
FIG. 20 is a flow chart showing an example process for a network to detect an abnormal event and to trigger an event at a network device using an indication representative of that abnormal event, according to embodiments of the present invention.

FIG. 20 is a flow chart 2000 showing an example process for a network to detect an abnormal event and to trigger an event at a network device using an indication representative of that abnormal event, according to embodiments of the present invention. Step 2002 includes monitoring the use of a utility by a network device. This step is optional because step 2004 may occur before the use is actually "monitored" over a period of time. Step 2004 includes compiling current usage data based on the use of the utility by the network device (e.g. over a predetermined time period). In other words, the network device may monitor the use of a utility, either within our outside of the network device, and compile or collect data based on that usage.

Step 2006A includes setting a threshold amount of usage based on the compiled usage data. The compiled usage data may be characterized as "normal" usage data, similar to that in step 1904B in FIG. 19. This historical, or normal, data may be used to analyze what a normal or historically average amount of usage is, and a threshold amount of usage may be determined based on that analysis. This threshold may be compared to a current amount of usage, for or at a predetermined amount of time, to determine if the current usage is normal or abnormal. For this comparison, step 2006B includes determining a current amount of usage at a usage time. In other words, the network device may monitor the use of a utility, either within our outside of the network device, and compile or collect data based on that usage at a specific predetermined time or over a predetermined period of time. For example, the current usage amount of time may be an accumulated amount of usage over a period of time, and the amount of current usage is determined at a given predetermined time.

In step 2008, the current usage time is compared to the threshold amount of usage. In other words, the current usage at a predetermined time is compared to the historical, or normal, usage of that utility. The threshold amount of usage is used to determine whether the current amount of usage is normal or abnormal, based on the historical data compiled over a (usually) longer period of time.

Step 1210 includes a query, which is related to step 2008, and asks whether the current usage abnormal as compared to the threshold amount of usage. If the answer to the query in step 2010 is "no", then the process reverts back to step 2006B, for example. If the answer to the query is "yes", then the process proceeds to step 2012. Step 2012 includes analyzing the usage data over a predetermined time period, wherein the predetermined time period occurred before (or during or after) the current usage time. This analysis is used to determine whether, for example, the trend or pattern existing just before (or during or after) the threshold being crossed is consistent with the fact that the usage crossed the threshold. This step may be used to avoid false positives, such that while the usage crossed the threshold, the usage does not soon after re-cross the threshold in the opposite direction such that the crossing of the threshold is not sustained for more than a very short period of time. This inquiry is explored in the query in step 2014.

Step 2014 includes another query, which asks whether the current usage amount exceeded the threshold for an extended period of time. If the answer to this query is "no", then the process reverts back to step 2006B, for example. If the answer to the query is "yes", then the process proceeds to step 2016, which includes sending a notification and/or deactivating the network device. This step is performed because if the current usage is deemed as having crossed the threshold and will stay there for more than a short period of time, the network device can notify the user or owner of the network device to tell the user that something is wrong, or can take action on its own and turn off the network device (for example, because it has deemed to be "abnormal" usage). Various other actions are possible, such as adjusting the network device in some way (e.g. turning the utility up or down, etc.).

Although the above-referenced processes have been discussed in the context of usage of a utility, the processes may be used for other types of situations. For example, instead of usage of a utility, the processes may be used in the context of measuring an aspect of an environment, such as measuring the temperature.

Figure 21:
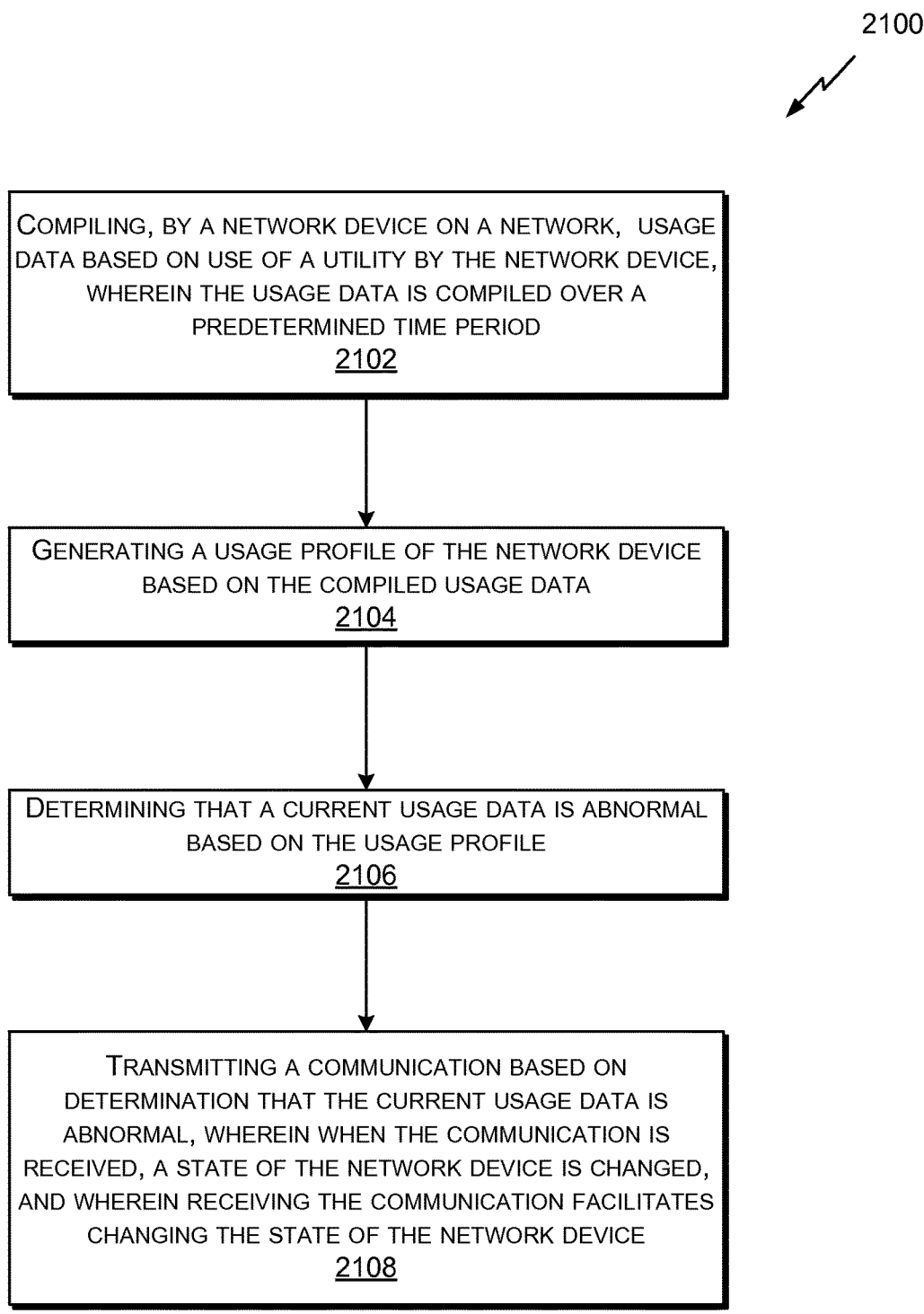
FIG. 21 is a flow chart showing an example process for a network to detect an abnormal event and to trigger an event at a network device using an indication representative of that abnormal event, according to embodiments of the present invention.

FIG. 21 is a flow chart 2100 showing an example process for a network to detect an abnormal event and to trigger an event at a network device using an indication representative of that abnormal event, according to embodiments of the present invention. Step 2102 includes compiling, by a network device on a network, usage data based on use of a utility by the network device, wherein the usage data is compiled over a predetermined time period. Step 2102 may include monitoring the use of a utility, either within our outside of the network device, and compile or collect data based on that usage over that predetermined time period. Step 2104 includes generating a usage profile of the network device based on the compiled usage data. In that step, the compiled usage data may be analyzed and turned into a usage profile that may define what usage of that utility looks like during that predetermined period of time. That time period may include less than a second, several seconds, several minutes, or much longer.

Step 2106 includes determining that the current usage data is abnormal based on the usage profile. This step may include comparing the usage profile based on any of a number of different methods, including comparing the usage profile to a normal usage profile or to a threshold usage.

Step 2108 includes transmitting a communication based on determination that the current usage data is abnormal, wherein when the communication is received, a state of the network device is changed, and wherein receiving the communication facilitates changing the state of the network device. In this step, the network device may transmit an indication to an access device of the user or owner of the network device to tell the user that current usage is abnormal. Alternatively, this step may include taking action at the network device, such as shutting the network device down or making an adjustment within the functionality of the network device (e.g. changing a setting or turning the utility up or down).

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
  compiling, by a network device on a network, historical usage data based on use of a utility by the network device, wherein the network includes multiple network devices on the network;
  generating a historical usage profile of the network device using the historical usage data, wherein the historical usage profile includes a threshold and a threshold delay associated with the threshold, wherein the threshold and the threshold delay are determined using the historical usage data, and wherein the threshold is associated with a boundary between normal and abnormal usage of the utility;
  compiling, by the network device on the network, current usage data based on use of a utility by the network device;
  generating a current usage profile of the network device based on the current compiled usage data;
  determining that the current usage data is abnormal based on the current usage profile and the historical usage profile, wherein determining that the current usage data is abnormal includes determining that a portion of the current usage data crosses the threshold;
  upon determining that the current usage data is abnormal, transmitting, by the network device, a notification to multiple additional network devices on the network;
  determining, by the network device, that the portion of the current usage data remains across the threshold for a period of time equal to or greater than the threshold delay; and
  broadcasting a communication to the multiple additional network devices on the network when the network device determines that the portion of the current usage data remains across the threshold for a period of time equal to or greater than the threshold delay, wherein when the communication is received, a state of the network device is changed, and wherein receiving the communication facilitates one of the multiple additional network devices changing the state of the network device.

2. The method of claim 1, wherein the communication includes an indication that the current usage data is abnormal.

3. The method of claim 1, wherein the network device includes a water dispensing mechanism.

4. The method of claim 3, wherein the changed state of the network device is an amount of flow of liquid per period of time.

5. The method of claim 3, wherein the changed state of the network device is a state of liquid dispensed by the water dispensing mechanism.

6. The method of claim 1, wherein the network device includes a thermostat.

7. The method of claim 6, wherein the changed state of the network device is a temperature sensed by a sensor within the thermostat.

8. The method of claim 1, wherein broadcasting the communication includes transmitting a light from an LED connected to the network device.

9. The method of claim 1, wherein broadcasting the communication includes transmitting audio from a speaker connected to the network device.

10. The method of claim 1, wherein determining current usage data includes determining a measurement by a sensor.

11. The method of claim 1, wherein broadcasting the communication includes transmitting a notification that is displayable when received.

12. A computing device, comprising:
  one or more processors; and
  a memory having instructions stored thereon, which when executed by the one or more processors, cause the computing device to perform operations including:
  compiling, by a network device on a network, historical usage data based on use of a utility by the network device, wherein the network includes multiple network devices on the network;
  generating a historical usage profile of the network device using the historical usage data, wherein the historical usage profile includes a threshold and a threshold delay associated with the threshold, wherein the threshold and the threshold delay are determined using the historical usage data, and wherein the threshold is associated with a boundary between normal and abnormal usage of the utility;
  compiling, by the network device on the network, current usage data based on use of a utility by the network device;
  generating a current usage profile of the network device based on the current compiled usage data;
  determining that the current usage data is abnormal based on the current usage profile and the historical usage profile, wherein determining that the current usage data is abnormal includes determining that a portion of the current usage data crosses the threshold;
  upon determining that the current usage data is abnormal, transmitting, by the network device, a notification to multiple additional network devices on the network;

determining, by the network device, that the portion of the current usage data remains across the threshold for a period of time equal to or greater than the threshold delay; and broadcasting a communication to the multiple additional network devices on the network when the network device determines that the portion of the current usage data remains across the threshold for a period of time equal to or greater than the threshold delay, wherein when the communication is received, a state of the network device is changed, and wherein receiving the communication facilitates one of the multiple additional network devices changing the state of the network device.

13. The computing device of claim 12, wherein the communication includes an indication that the current usage data is abnormal.

14. The computing device of claim 12, wherein the network device includes a water dispensing mechanism.

15. The computing device of claim 14, wherein the changed state of the network device is an amount of flow of liquid per period of time.

16. The computing device of claim 14, wherein the changed state of the network device is a state of liquid dispensed by the water dispensing mechanism.

17. The computing device of claim 12, wherein the network device includes a thermostat.

18. The computing device of claim 17, wherein the changed state of the network device is a temperature sensed by a sensor within the thermostat.

19. The computing device of claim 12, wherein broadcasting the communication includes transmitting a light from an LED connected to the network device.

20. The computing device of claim 12, wherein broadcasting the communication includes transmitting audio from a speaker connected to the network device.

21. The computing device of claim 12, wherein determining current usage data includes determining a measurement by a sensor.

22. The computing device of claim 12, wherein broadcasting the communication includes transmitting a notification that is displayable when received.

23. A computer-program product tangibly embodied in a non-transitory machine-readable storage medium, including instructions configured to cause a data processing apparatus to:

compile, by a network device on a network, historical usage data based on use of a utility by the network device, wherein the network includes multiple network devices on the network;

generate a historical usage profile of the network device using the historical usage data, wherein the historical usage profile includes a threshold and a threshold delay associated with the threshold, wherein the threshold and the threshold delay are determined using the historical usage data, and wherein the threshold is associated with a boundary between normal and abnormal usage of the utility;

compile, by the network device on the network, current usage data based on use of a utility by the network device;

generate a current usage profile of the network device based on the current compiled usage data;

determine that the current usage data is abnormal based on the current usage profile and the historical usage profile, wherein determining that the current usage data is abnormal includes determining that a portion of the current usage data crosses the threshold;

upon determining that the current usage data is abnormal, transmit, by the network device, a notification to multiple additional network devices on the network;

determine, by the network device, that the portion of the current usage data remains across the threshold for a period of time equal to or greater than the threshold delay; and broadcast a communication to the multiple additional network devices on the network when the network device determines that the portion of the current usage data remains across the threshold for a period of time equal to or greater than the threshold delay, wherein when the communication is received, a state of the network device is changed, and wherein receiving the communication facilitates one of the multiple additional network devices changing the state of the network device.

24. The non-transitory computer-readable storage medium of claim 23, wherein the communication includes an indication that the current usage data is abnormal.

25. The non-transitory computer-readable storage medium of claim 23, wherein the network device includes a water dispensing mechanism.

26. The non-transitory computer-readable storage medium of claim 25, wherein the changed state of the network device is an amount of flow of liquid per period of time.

27. The non-transitory computer-readable storage medium of claim 25, wherein the changed state of the network device is a state of liquid dispensed by the water dispensing mechanism.

28. The non-transitory computer-readable storage medium of claim 23, wherein the network device includes a thermostat.

29. The non-transitory computer-readable storage medium of claim 28, wherein the changed state of the network device is a temperature sensed by a sensor within the thermostat.

30. The non-transitory computer-readable storage medium of claim 23, wherein broadcasting the communication includes transmitting a light from an LED connected to the network device.

31. The non-transitory computer-readable storage medium of claim 23, wherein broadcasting the communication includes transmitting audio from a speaker connected to the network device.

32. The non-transitory computer-readable storage medium of claim 23, wherein determining current usage data includes determining a measurement by a sensor.

33. The non-transitory computer-readable storage medium of claim 23, wherein broadcasting the communication includes transmitting a notification that is displayable when received.

* * * * *